US012108500B2

(12) United States Patent
Riemensperger et al.

(10) Patent No.: US 12,108,500 B2
(45) Date of Patent: Oct. 1, 2024

(54) APPARATUS FOR FEEDING AND DOSING POWDER, APPARATUS FOR PRODUCING A LAYER STRUCTURE ON A SURFACE AREA OF A DEVICE, PLANAR HEATING ELEMENT AND METHOD FOR PRODUCING A PLANAR HEATING ELEMENT

(71) Applicant: ecoCOAT GmbH, Allershausen (DE)

(72) Inventors: Reinhold Riemensperger, Allershausen (DE); Enrico Flade, Eching (DE)

(73) Assignee: ecoCOAT GmbH, Allershausen (DE)

( * ) Notice: Subject to any disclaimer, the term of this patent is extended or adjusted under 35 U.S.C. 154(b) by 990 days.

(21) Appl. No.: 17/028,146

(22) Filed: Sep. 22, 2020

(65) Prior Publication Data

US 2021/0007184 A1 Jan. 7, 2021

Related U.S. Application Data

(63) Continuation of application No. PCT/EP2019/057187, filed on Mar. 22, 2019.

(30) Foreign Application Priority Data

Mar. 22, 2018 (DE) ..................... 10 2018 204 428.7
Mar. 22, 2018 (DE) ..................... 10 2018 204 429.5

(51) Int. Cl.
*H05B 3/22* (2006.01)
*B05B 7/14* (2006.01)
(Continued)

(52) U.S. Cl.
CPC ............. *H05B 3/22* (2013.01); *B05B 7/1445* (2013.01); *B05B 7/22* (2013.01); *C23C 4/02* (2013.01);
(Continued)

(58) Field of Classification Search
CPC ........... H05B 3/22; B05B 7/1445; B05B 7/22; C23C 4/06; C23C 4/08; C23C 4/02
See application file for complete search history.

(56) References Cited

U.S. PATENT DOCUMENTS 4,576,526 A 3/1986 Mueller et al.
4,863,316 A 9/1989 Gianella et al.
(Continued)

FOREIGN PATENT DOCUMENTS

CN 1031208 A 2/1989
DE 17038X1/81 e 1/1955
(Continued)

*Primary Examiner* — Thien S Tran
(74) *Attorney, Agent, or Firm* — PERKINS COIE LLP; Michael A. Glenn

(57) ABSTRACT

An apparatus for feeding and dosing powder includes a powder storage container, an oscillating feeder with feeder with adjustable feeding rate for dispensing the powder to a powder outlet, a conduit arrangement for feeding the powder dispensed from the oscillating feeder in a feeding gas as a powder-gas mixture and for supplying the powder-gas mixture to a powder processor, wherein a decoupler is provided in the conduit arrangement to extract a defined proportion of the powder from the powder-gas mixture, a powder quantity measuring arrangement for detecting the decoupled powder quantity and for providing a powder quantity information signal, wherein the extracted powder quantity has a predetermined ratio to the fed powder quantity of the oscillating feeder, and controller configured to adjust the adjustable feeding rate of the oscillating feeder to a predetermined set value based on the powder quantity information signal provided.

17 Claims, 10 Drawing Sheets

(51) Int. Cl.

| | |
|---|---|
| ***B05B 7/22*** | (2006.01) |
| ***C23C 4/02*** | (2006.01) |
| ***C23C 4/06*** | (2016.01) |
| ***C23C 4/134*** | (2016.01) |
| ***H05H 1/42*** | (2006.01) |

(52) U.S. Cl.

CPC ................ *C23C 4/06* (2013.01); *C23C 4/134* (2016.01); *H05H 1/42* (2013.01)

(56) References Cited

U.S. PATENT DOCUMENTS

| | | | | |
|---|---|---|---|---|
| 5,487,624 | A | 1/1996 | Toyota et al. | |
| 5,928,423 | A | 7/1999 | Toyota et al. | |
| 6,057,515 | A | 5/2000 | Murai et al. | |
| 6,155,096 | A * | 12/2000 | Ikeda | G01N 21/85 73/1.88 |
| 6,176,647 | B1 | 1/2001 | Itoh | |
| 6,390,383 | B1 | 5/2002 | Fusaro et al. | |
| 6,762,396 | B2 | 7/2004 | Abbott et al. | |
| 7,631,816 | B2 | 12/2009 | Jabado et al. | |
| 8,241,710 | B2 | 8/2012 | Suess-Wolf et al. | |
| 2003/0006250 | A1* | 1/2003 | Tapphorn | B05B 7/1445 222/163 |
| 2005/0173555 | A1* | 8/2005 | Hirota | B05B 12/08 239/74 |
| 2009/0314520 | A1* | 12/2009 | Suss-Wolf | H05K 3/14 174/250 |
| 2012/0115254 | A1 | 5/2012 | Singh | |
| 2014/0367367 | A1* | 12/2014 | Wood | B22F 10/47 219/76.12 |
| 2016/0163432 | A1 | 6/2016 | Martin et al. | |

FOREIGN PATENT DOCUMENTS

| | | | | |
|---|---|---|---|---|
| DE | 3211712 | A1 | 10/1982 | |
| DE | 10234013 | A1 | 6/2003 | |
| DE | 102004013153 | A1 | 10/2005 | |
| DE | 102006061435 | A1 | 6/2008 | |
| DE | 102010013850 | A1 | 10/2011 | |
| DE | 102008062809.3 | B4 | 1/2012 | |
| DE | 102013010858 | A1 | 12/2014 | |
| DE | 102013114384 | A1 * | 6/2015 | B05B 7/1445 |
| DE | 102016101684 | A1 | 8/2017 | |
| EP | 1635623 | A2 | 3/2006 | |
| EP | 1806429 | A1 | 7/2007 | |
| EP | 3211974 | A1 | 8/2017 | |
| JP | H05238560 | A | 9/1993 | |
| WO | 2010072332 | A1 | 7/2010 | |
| WO | 2017129182 | A1 | 8/2017 | |

* cited by examiner

APPARATUS FOR FEEDING AND DOSING POWDER, APPARATUS FOR PRODUCING A LAYER STRUCTURE ON A SURFACE AREA OF A DEVICE, PLANAR HEATING ELEMENT AND METHOD FOR PRODUCING A PLANAR HEATING ELEMENT

CROSS-REFERENCE TO RELATED APPLICATIONS

This application is a continuation of copending International Application No. PCT/EP2019/057187, filed Mar. 22, 2019, which is incorporated herein by reference in its entirety, and additionally claims priority from German Applications Nos. 10 2018 204 429.5, filed Mar. 22, 2018, and 10 2018 204 428.7, filed Mar. 22, 2018, which are all incorporated herein by reference in their entirety.

The present invention relates to an apparatus and a method for feeding and dosing powder to a powder processing means, such as a plasma spraying means or a plasma nozzle, in order to supply the powder needed for plasma coating or plasma spraying to the powder processing means with a high degree of accuracy. Further, embodiments relate to an apparatus and method for producing a layer structure on a surface area of a device, wherein the powder particles quantity supplied with a high degree of accuracy is activated, for example in the powder processing means in a plasma spraying process, and then applied to a substrate or the surface area of the device. Embodiments further relate to a planar heating element in which a planar, electrically conductive resistor layer structure is applied to the surface area of the device by means of plasma coating or plasma spraying.

BACKGROUND OF THE INVENTION

According to conventional technology, so-called powder feeders are used to dose a supplied powder particles quantity and to supply the dosed powder quantity to a powder processing means, such as a plasma coating or plasma spraying means. Then, plasma flows, such as plasma jets, are used in plasma coating means to treat or coat surfaces. In the context of surface treatment, plasmas are used, for example, for plasma-induced material deposition. In coating technology, for example, functional layers, such as mirror coatings or non-stick coatings, are applied. In materials engineering, plasmas are used, for example, for plasma-induced material deposition.

SUMMARY

According to an embodiment, an apparatus for feeding and dosing powder may have: a powder storage container for storing and providing powder, an oscillating feeder having feeding means with an adjustable feeding rate for dispensing the powder to a powder outlet with the adjustable feeding rate, a conduit arrangement for feeding the powder dispensed by the oscillating feeder in a feeding gas as a powder-gas mixture and for supplying the powder-gas mixture to a powder processing means, wherein a decoupling means is provided in the conduit arrangement for extracting a defined proportion of the powder from the powder-gas mixture, a powder quantity measuring arrangement for detecting the decoupled powder quantity per unit time and for providing a powder quantity information signal, wherein the decoupled powder quantity per unit time has a predetermined ratio to the fed powder quantity of the oscillating feeder within a tolerance range, and control means configured to adjust the adjustable feeding rate of the oscillating feeder to a predetermined set value based on the powder quantity information signal provided by the powder quantity measuring arrangement.

According to another embodiment, an apparatus for producing a layer structure on a surface area of a device may have: an inventive apparatus for feeding and dosing powder as mentioned above, for providing powder particles to a plasma spraying arrangement; and a plasma spraying arrangement having a plasma source for introducing plasma into a process area to activate the provided powder particles in the process area with the plasma, and application means for applying the activated powder particles to the surface area of the device to obtain the layer structure on the surface area of the device.

According to another embodiment, a method for producing a layer structure on a surface area of a device may have the steps of: providing powder particles in a process area of a plasma spraying means with the inventive apparatus for feeding and dosing powder as mentioned above, activating the provided powder particles in a process area of a plasma spraying arrangement with the plasma of a plasma source, and applying the activated powder particles to the surface area of the device to obtain the layer structure on the surface area of the device.

According to still another embodiment, a planar heating element may have: an electrical heating resistor element and first and second planar, electrically conductive layer areas, wherein the electrical heating resistor element is arranged between the first and second planar, electrically conductive layer areas, wherein the first planar, electrically conductive layer area is arranged as a first contact terminal area at least in areas on a first edge area of the electrical resistor heating element and is electrically connected and materially bonded to the same, wherein the second planar, electrically conductive layer area is arranged as a second contact terminal area at least in areas on a second edge area of the electrical resistor heating element and is electrically connected and materially bonded to the same, and wherein the first and second planar, electrically conductive layer areas have a conductivity that is at least twice as high as that of the electrical heating resistor element.

According to another embodiment, a method for producing a planar heating element may have the steps of: providing an electrical heating resistor element on a surface area of a device and applying first and second planar, electrically conductive layer areas on a surface area of a device with the electrical heating resistor element by plasma coating or by plasma spraying, wherein the electrical heating resistor element is arranged between the first and second planar, electrically conductive layer areas, wherein the first planar, electrically conductive layer area is arranged as a first contact terminal area at least in areas on a first edge area of the electrical resistor heating element and is electrically connected and materially bonded to the same, wherein the second planar, electrically conductive layer area is arranged as a second contact terminal area at least in areas on a second edge area of the electrical resistor heating element and is electrically connected and materially bonded to the same, and wherein the first and second planar, electrically conductive layer areas have a conductivity that is at least twice as high as that of the electrical heating resistor element.

According to an embodiment, an apparatus 100 for feeding and dosing powder 112 comprises a powder storage container 110 for storing and providing powder 112, an oscillating feeder 120 comprising feeding means 122 with an adjustable feeding rate for dispensing the powder 112 to a powder outlet 124 with the adjustable feeding rate, a conduit arrangement 130 for feeding the powder 112 dispensed by the oscillating feeder 120 in a feeding gas 115 as a powder-gas mixture 116 and for supplying the powder-gas mixture 116 to a powder processing means 200, wherein a decoupling means 132 is provided in the conduit arrangement 130 for extracting a defined proportion PM2 of the powder 112 from the powder-gas mixture 116, a powder quantity measuring arrangement 140 for detecting the decoupled powder quantity PM2 per unit time and for providing a powder quantity information signal S1, wherein the extracted or decoupled powder quantity PM2 per unit time has a predetermined ratio to the fed powder quantity PM1 of the oscillating feeder 120 within a tolerance range, and control means 150 configured to adjust the adjustable feeding rate of the oscillating feeder 120 to a predetermined set value based on the powder quantity information signal S1 provided by the powder quantity measuring arrangement 140.

According to an embodiment, an apparatus 101 for producing a layer structure 270 on a surface area 262 of a device 260 comprises the apparatus 100 for feeding and dosing powder 112 for providing powder particles 112 to a plasma coating arrangement (also: plasma spraying arrangement) 200, and a plasma coating arrangement 200 comprising a plasma source 208 for introducing plasma 210 in a process area 206 to activate the provided powder particles 112 in the process area 206 with the plasma 210, and application means 212 for applying the activated powder particles 112 to the surface 262 of the device 260 to obtain the layer structure 270 on the surface area 262 of the device 260.

According to an embodiment, a method for producing a layer structure 270 on a surface area 262 of a device 260 comprises the following steps: providing powder particles in a process area of a plasma coating means with the apparatus 100 for feeding and dosing powder 112, activating the provided powder particles 112 in a process area 206 of a plasma coating arrangement 200 with the plasma 210 of a plasma source 208, and applying the activated powder particles 112 to the surface area 262 of the device 260 to obtain the layer structure 270 on the surface area 262 of the device 260.

According to an embodiment, a planar heating element 300 comprises an electrical heating resistor element 270-3 and first and second planar, electrically conductive layer areas 270-1, 270-2, wherein the electrical resistor heating element 270-3 is arranged between the first and second planar, electrically conductive layer areas 270-1, 270-2, wherein the first planar, electrically conductive layer area 270-1 is arranged as a first contact terminal area at least in areas on a first edge area 270-3A of the electrical resistor heating element 270-3 and is electrically connected and materially (or firmly) bonded to the same, wherein the second planar, electrically conductive layer area 270-2 is arranged as a second contact terminal area at least in areas on a second edge area 270-3B of the electrical heating resistor element 270-3 and is electrically connected and materially bonded to the same, and wherein the first and second planar, electrically conductive layer areas 270-1, 270-2 have a conductivity that is at least twice as high as that of the electrical heating resistor element 270-3.

According to an embodiment, a method for producing a planar heating element 300 comprises the following steps: providing an electrical heating resistor element 270-3 on a surface area 262 of a device 260 and applying first and second planar, electrically conductive layer areas 270-1, 270-2 on a surface area 262 of a device 260 with the electrical heating resistor element 270-3 by means of a plasma coating or by means of plasma spraying, wherein the electrical heating resistor element 270-3 is arranged between the first and second planar, electrically conductive layer areas 270-1, 270-2, wherein the first planar, electrically conductive layer area 270-1 is arranged as a first contact terminal area at least in areas on a first edge area 270-3A of the electrical resistor heating element 270-3 and is electrically connected and materially bonded to the same, wherein the second planar, electrically conductive layer area 270-2 is arranged as a second contact terminal area at least in areas on a second edge area 270-3A of the electrical resistor heating element 270-3 and is electrically connected and materially bonded to the same, and wherein the first and second planar, electrically conductive layer areas 270-1, 270-2 have a conductivity that is at least twice as high as that of the electrical heating resistor element 270-31.

The core idea of the present invention is to enable the most accurate possible feeding and dosing of the quantity of powder particles supplied to a plasma coating arrangement to obtain extremely uniform and precise plasma-induced layer generation on a surface area of a device. For this purpose, a defined proportion of the powder is extracted from the powder-gas mixture dispensed by the powder feeding means by means of a decoupling means in the conduit arrangement downstream in the oscillating feeder and supplied to a powder quantity measuring arrangement that determines the decoupled powder quantity per unit time and provides a respective powder quantity information signal to a control means. The extracted powder quantity per unit time has a predetermined ratio to the total powder quantity fed by the oscillating feeder or to the total powder quantity of the powder-gas mixture in the conduit arrangement within a tolerance range. The control means is configured to control the oscillating feeder with a control signal based on the powder quantity information signal provided by the powder quantity measuring arrangement to adjust the feeding rate of the oscillating feeder to a predetermined set or target value, i.e. to the target feeding rate, so that the exact dosage of the fed powder quantity to the powder processing means can be obtained.

By controlling or regulating the adjustable feeding rate of the oscillating feeder 120 of the apparatus 100 for feeding and dosing powder, the regulation or control of the feeding rate of the oscillating feeder 120 to the predetermined set value can be performed during operation of the powder processing means 200, i.e., for example, during a coating or spraying process of a plasma nozzle. Thus, according to the present concept, the feeding rate of the oscillating feeder of the apparatus for feeding dosage and powder can thus be performed simultaneously with the operation of the powder processing means. By decoupling the powder quantity PM2 per unit time, the powder quantity measuring arrangement, in the form of a load cell or an optical detection means, can further be arranged, for example, mechanically decoupled from the oscillating feeder, so that the powder quantity determination can be mechanically decoupled or separated from the oscillations or vibrations of the oscillating feeder. This results in a further increase of the accuracy of the adjustment of the feeding rate of the oscillating feeder and thus of the powder quantity per unit time supplied to the powder processing means.

Due to the extremely exact dosage of the needed powder quantity to the powder processing means, e.g. to a plasma coating arrangement or a plasma nozzle for plasma spraying, essentially any surface structures of a device can be coated extremely uniformly and exactly, wherein further the electrical properties of the applied layer structures can be adjusted and dimensioned very exactly. Thus, for example, planar contact areas can be applied in a plasma-induced manner on a surface area of a device, which can be electrically connected and materially bonded to the edge areas of an intermediate electrical (e.g. planar) heating resistor element. In addition, the applied layer structures can be materially bonded to the device to be coated or can be integrally formed.

As contact surfaces, a highly conductive material, e.g. a metal or a metal alloy, can be applied as layer structure to the surface area of the device, wherein these highly conductive contact surface structures can be suitably formed for a solder connection. If, for example, the metal layer has a copper material etc. as a main component, a common solder can be used to "solder" a lead wire to the respective planar contact terminal area. Due to the feeding rate adjusted for the oscillating feeder, i.e. by the powder quantity applied to the surface area of the device and the resulting particle concentration, which comprise, for example, a conductive material, the resistor coating or the layer resistor (reciprocal to the conductivity) of the respective planar, electrically conductive layer area can be formed, so that these layer areas can be configured as contact terminal areas for the electrical heating resistor element. In particular, the contact terminal areas are connected (and bonded) to the edge area of the electrical heating resistor element both electrically and materially, i.e. essentially inseparably, by the plasma-induced layer application method.

By plasma spraying by means of the plasma coating arrangement or plasma nozzle according to the present concept, the electrical heating resistor element can also be applied as a planar resistor structure, applied by means of a plasma coating, to the surface area of the device and materially bonded to the same. Thereby, any structures of the electrical heating resistor element can be generated between the contact terminal areas, e.g. linear, crossing, meandering, etc., wherein the resulting geometry of the planar conductive structure(s) can be adjusted according to the application.

Further, according to a first embodiment, it is possible to use different powder materials or layer materials with different resulting coating resistances (also area resistances) during the application process both for the contact terminal areas and for the planar resistor structure, which is configured as electrical heating resistor element between the contact terminal areas.

Further, it is possible to use the same powder material or layer material both for the contact terminal areas and for the planar resistor structure, wherein for the contact terminal areas, by means of multiple coating or by means of several coating processes, a "denser" or thicker coating layer can be generated, which has a considerably higher conductivity (surface conductivity), e.g. at least by a factor of two, five or ten, compared to the planar resistor structure which acts as an electrical heating resistor element.

Further, it is also possible that the contact terminal areas are arranged as elongated areas or islands within the applied planar resistor structure of the electrical heating resistor element, e.g. at edge areas of the same.

Due to the planar or relatively large-area contact terminal areas for the planar resistor structure configured as electrical heating element, it is possible to couple a sufficiently high power over a large area into the planar resistor structure configured as electrical heating resistor element to obtain sufficient heating due to the conversion of electrical energy into thermal energy (heat).

The electrically conductive layer areas acting as contact terminal areas can, for example, be formed on top of each other with the planar resistor structure acting as an electrical heating resistor element by means of a plasma coating or plasma spraying process.

Embodiments will be explained in more detail below with reference to the accompanying drawings. With regard to the illustrated schematic figures, it should be noted that the functional shown are to be understood both as elements and features of the inventive apparatus(es) and as corresponding method steps of the inventive method, and corresponding method steps of the inventive method can also be derived therefrom.

BRIEF DESCRIPTION OF THE DRAWINGS

Embodiments of the present invention will be detailed subsequently referring to the appended drawings, in which.

DETAILED DESCRIPTION OF THE INVENTION

Before embodiments of the present concept will be explained in detail below based on the drawings, it should be noted that identical, functionally equal or equal elements, objects, functional blocks and/or method steps are provided with the same reference numbers in the different figures, so that the description of these elements, objects, functional blocks and/or method steps shown in different embodiments is interchangeable or interapplicable.

Various embodiments will be described in more detail with reference to the accompanying drawings, where some embodiments are illustrated. In the figures, dimensions of illustrated elements, layers and/or areas may not be shown to scale for clarification.

Figure 1:
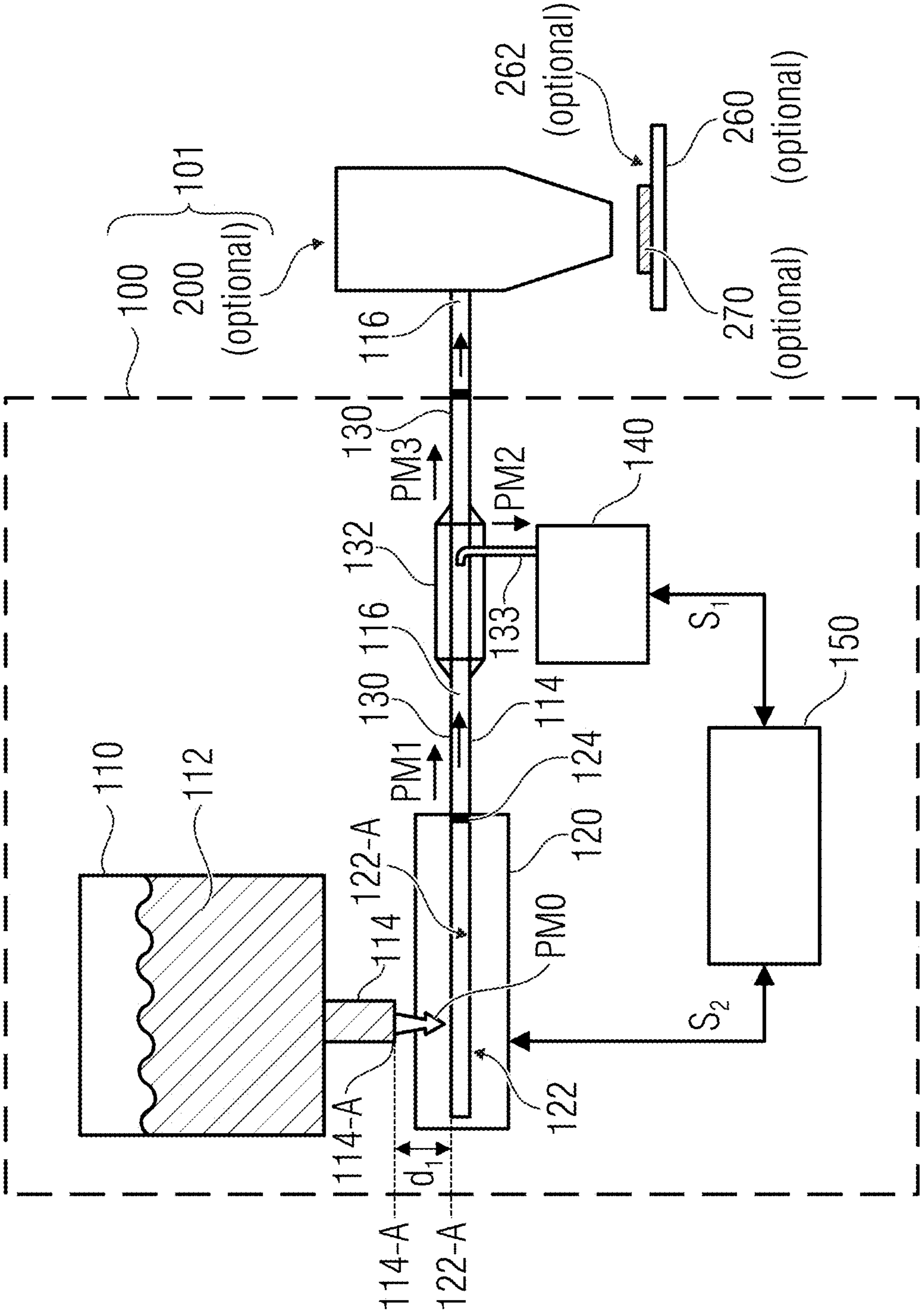
FIG. 1 is a schematic block diagram of an apparatus for feeding and dosing powder according to an embodiment.

FIG. 1 shows a schematic diagram of an apparatus 100 for feeding or supplying and dosing powder 112 according to an embodiment. The apparatus 100 for feeding and dosing powder 112 comprises a powder storage container 110 for storing and providing powder 112. The apparatus 100 further comprises an oscillating feeder 120 with a feeding means or feeder chute 122, the feeding rate of which for dispensing powder 112 to a powder outlet 124 is adjustable to provide a powder quantity PM1 per unit time (e.g. per second) at the powder outlet 124. The apparatus 100 further comprises a conduit arrangement 130 for feeding the powder 112 dispensed by the oscillating feeder 120 in a feeding gas 115 as a powder-gas mixture 116 and for feeding the powder-gas mixture 116 to an (optional) powder processing means 200, which may be configured, for example, as a plasma coating arrangement or plasma nozzle 200 for plasma spraying according to DIN 657. The conduit arrangement 130 further comprises a decoupling means or a bypass 132 to decouple or extract a defined proportion or a defined powder quantity PM2 of the powder 112 from the powder-gas mixture 116. The apparatus 100 further comprises a powder quantity measuring arrangement 140 for detecting the ecoupled powder quantity per unit time and for providing a powder quantity information signal S1 based on the decoupled powder quantity per unit time. The decoupling means 132 is configured such that the extracted powder quantity PM2 per unit time has a predetermined ratio to the fed powder quantity PM1 (total powder quantity) of the oscillating feeder 120 within a tolerance range and thus also a predetermined ratio to the powder quantity PM3 (=fed powder quantity PM1 minus extracted powder quantity PM2) per unit time supplied from the conduit arrangement 130 to the powder processing means 200.

The apparatus 100 further comprises a control means 150 configured to control the oscillating feeder 120 with a control signal S2 based on the powder quantity information signal S1 provided by the powder quantity measuring arrangement 140 to adjust the feeding rate of the oscillating feeder 120 to a predetermined setor target value, i.e. to the target feeding rate PM1, such that the exact dosage of the fed powder quantity PM1 and thus the powder quantity PM3 supplied to the powder processing means 200 can be obtained.

For the control of the oscillating feeder 120 for adjusting the feeding rate of the oscillating feeder 120 to a predetermined target feeding rate performed by the control means 150 to provide sufficiently good results, a tolerance range is established within which the extracted powder quantity PM2 per unit time, which is decoupled from the powder-gas mixture by the decoupling means 132, should be present in a predetermined fixed ratio to the fed powder quantity or total powder quantity PM1 of the oscillating feeder 120. Thus, a tolerance range for the predetermined ratio between the extracted powder quantity PM2 per unit time to the fed powder quantity PM1 per unit time of the oscillating feeder 120 is established. The tolerance range can thus indicate, for example, that the actual ratio of the extracted powder quantity per unit time to the total powder quantity per unit time fed by the oscillating feeder 120 deviates from the specified ratio by less than 20%, 10%, 5%, 2%, 1% or 0.1% or that there is no or only a negligible deviation. The lower the tolerance range is assumed and can be maintained, the more precisely the control means 150 can adjust the adjustable feeding rate of the oscillating feeder 120 to the predetermined target feeding rate.

The tolerance range can, for example, take into account varying environmental parameters, such as temperature, etc., or deviating physical properties of the powder, such as size and/or density of the powder particles, or variations (fluctuations) in the gas pressure or gas temperature of the feeding gas 115 or other environmental parameters and/or influencing variables.

According to an embodiment, the decoupling means 132 is configured to extract a predefined proportion or the predetermined ratio of the powder quantity PM1 in the powder-gas mixture 116, which is dispensed by the oscillating feeder 120 at the powder outlet 124 and transported in the conduit arrangement 130. For example, the decoupling means 132 can be provided with a decoupling path 133 as a conduit or pipe section of the conduit arrangement 130. In particular, the decoupling means 132 can be divided into different volume areas along the flow direction of the powder-gas mixture to achieve a homogeneous distribution of the powder-gas mixture in the decoupling means 132, in order to maintain as accurately as possible the predetermined ratio between the extracted powder quantity PM2 per unit time and the fed powder quantity PM1 of the oscillating feeder 120 or the powder quantity PM3 supplied to the powder processing means 200. According to an embodiment, the decoupling means 132 can have an inlet area, an expansion area or suction area, a homogenization area, a decoupling or extracting area and an output or compression area in the flow direction of the powder-gas mixture. In this respect, reference is also made to the detailed description referring to FIG. 3*a*-*b*.

According to an embodiment, the powder quantity measuring arrangement 140 is configured to detect or determine the weight of the decoupled powder quantity PM2 per unit time based on the extracted or decoupled powder quantity PM2 per unit time. Based on the detected weight of the decoupled powder quantity per unit time, the powder quantity information signal S1 can then be provided by the powder quantity measuring arrangement 140 to the control means 150.

According to an embodiment, the powder quantity measuring arrangement 140 can be configured as a load cell or scale to "directly" detect the weight (or mass) of the decoupled powder quantity per unit time.

According to another embodiment, the powder quantity measuring arrangement 140 can be configured to optically detect the number of decoupled powder particles 112 and to provide the powder quantity information signal S1 with the number of decoupled powder particles to the control means 150.

According to another embodiment, the powder quantity measuring arrangement 140 can be configured to optically detect the number and, for example, the respective size or average size of the decoupled powder particles 112 and to provide the powder quantity information signal S1 with the number and (respective or average) size of the decoupled powder particles to the control means 150.

Based on the number and (respective or average) size of the decoupled powder particles, the volume of the decoupled powder quantity PM2 per unit time can be determined, wherein based on the determined volume of the decoupled powder quantity per unit time and further the (e.g. predetermined) material density of the used powder particles, the weight of the decoupled powder quantity PM2 per unit time can be determined.

The volume and/or weight of the decoupled powder quantity PM2 per unit time can be determined or calculated in the powder quantity measuring arrangement 140 or in the control means 150.

For the optical detection of the decoupled powder quantity PM2, the powder quantity information signal S1 provided by the powder quantity measuring arrangement 140 can include at least the number of decoupled powder particles, as far as the average size and the average material density of the decoupled powder particles is known and available as information. Thus, for example, the powder quantity measuring arrangement 140 or the control means 150 can perform the calculation of the weight of the decoupled powder quantity PM2 per unit time.

According to an embodiment, the control means 150 is configured to determine the current feeding rate PM1 of the oscillating feeder 120 based on the powder quantity information signal S1 and, if the current feeding rate of the oscillating feeder 120 deviates from the target feeding rate, to control the oscillating feeder 120 so as to adjust the current feeding rate PM1 to the target feeding rate PM.

During operation of the apparatus 100 for feeding and dosing powder 12, the control means 150 can thus be configured to continuously adjust or track the current adjustable feeding rate of the oscillating feeder 120 to the desired target feeding rate.

The feeding means 122 of the oscillating feeder 120 is, for example, excited to an oscillating movement perpendicular and parallel to the feeding direction to convey the powder or powder particles 112, the oscillating feeder 120 being configured to perform an oscillating movement of the feeding means 122 with an oscillating frequency of 1 Hz to 1 kHz or of 50 Hz to 300 Hz or above at an oscillation width or oscillation amplitude in a range of 1 μm to 1 mm or of 5 μm to 200 μm to obtain the adjustable feeding rate.

According to an embodiment, the oscillating feeder 120 can be configured as a piezoelectrically or magnetically driven feeding means 122, i.e. the oscillation frequency and oscillation width is obtained by means of piezoelectric and/or magnetic actuators.

According to an embodiment, the control means 150 can be configured to supply the control signal S2 to the oscillating feeder 120 based on the powder quantity information signal S1 to adjust the oscillating movement of the feeding means 122 of the oscillating feeder 120 and to obtain the target feeding rate.

According to an embodiment, the powder storage container 110 comprises an outlet means or an outlet valve 114 for providing the powder to the feeding means 122. Here, for example, the provision rate of powder 112 or the powder quantity PM0 per unit time from the powder storage container 110 to the feeding means 122 of the oscillating feeder 120 depends on the adjusted distance d1 between the outlet end 114-A of the outlet means 114 and the feeding surface area 122-A of the feeding means 122.

According to an embodiment, a distance adjustment means (not shown in FIG. 1) may be provided to adjust the distance or gap d1 between the outlet end 114-A of the outlet means 114 and the feeding surface area 122-A of the feeding means 122, for example to provide a pre-dosage or coarse dosage of the powder quantity PM0 provided by the powder storage container 110 to the feeding means 122 of the oscillating feeder 120.

As already mentioned above, the powder processing unit 200, to which the powder-gas mixture 116 is provided with the adjusted powder quantity PM3 per unit time, can be configured, for example, as a plasma coating arrangement or a plasma nozzle for plasma spraying in accordance with DIN 657.

The powder feeding means 100 is generally applicable for all applications for dosed feeding or supplying an aerosol to the powder processing unit 200. An aerosol is, for example, particles or solids carried in a carrier gas. In addition to plasma coating or plasma spraying applications, the powder feeding means 100 can also be used in laser deposition welding processes or laser plasma coating processes.

The overall arrangement 101 for producing a layer structure 270 on a surface area 262 of a device 260 shown in FIG. 1 can thus comprise the apparatus 100 for feeding and dosing powder 112 described above and a plasma coating arrangement 200. For example, the plasma coating arrangement 200 may comprise a plasma source for introducing a plasma into a process area to activate the provided powder particles in the process area with the plasma, and may further comprise an applicator or outlet nozzle for applying the activated powder particles on the surface area of the device to obtain the layer structure on the surface area of the device. In this respect, reference is made to the following description in connection with FIGS. 4 and 5*a-c*.

According to embodiments, the device 260 can also be configured as a multilayer element, wherein, for example, a primer layer can be provided on the surface area 262 of the device 260. According to the embodiments, a cover layer or protective layer (not shown) can also be optionally provided on the surface area 262 of the device 260 provided with the planar heating element 300 (not shown), for example to protect the planar heating element 300 from environmental influences or to provide mechanical protection for the planar heating element 300.

Figure 2A:
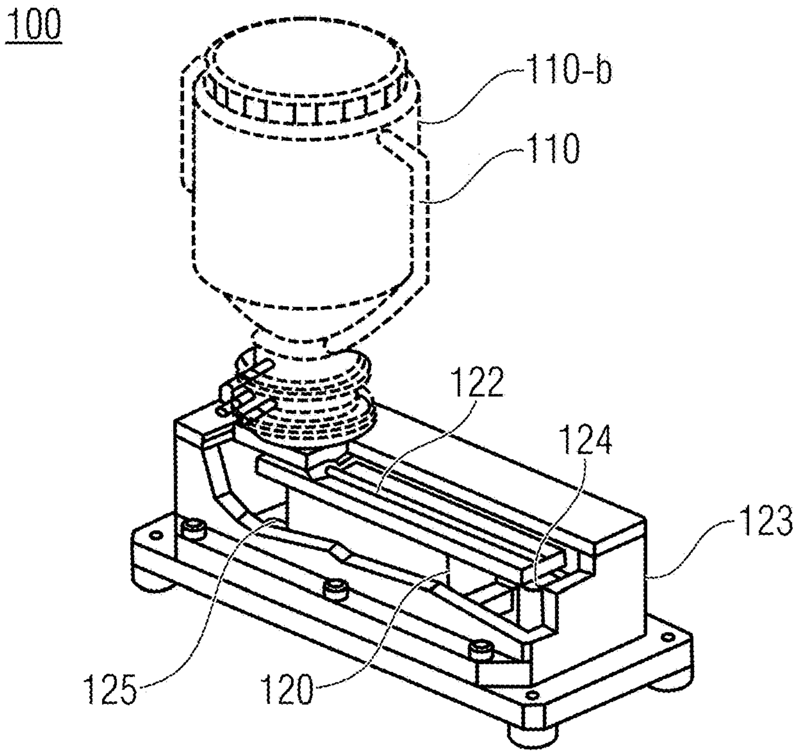
FIG. 2*a-b* is a perspective view and a partial sectional view of a possible implementation of a powder storage container and an oscillating feeder of the apparatus for feeding and dosing powder according to an embodiment.
Figure 2B:
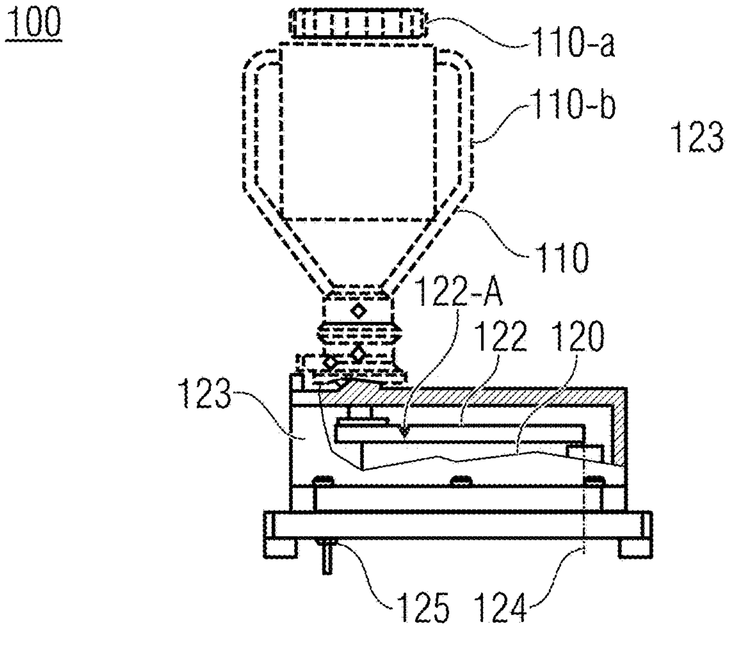

FIG. 2*a-b* show a perspective view and a partial sectional view of a possible implementation of the powder storage container 110 and the oscillating feeder 120 of the apparatus 100 for feeding and dosing powder 112 according to an embodiment.

With reference to FIG. 2*a* and FIG. 2*b*, the apparatus 100 for feeding powder 112 comprises, according to the embodiment of the invention, a powder storage container 110, an oscillating feeder 120 with a feeding means 122 configured as a feeder chute, and a housing 123 with a gas inlet 125 and a powder outlet 124.

The powder storage container 110 has a main body 110-*b*, which has a refill opening at its upper end that can be closed with a lid 110-*a*. At its lower end, the powder storage container 110 has an opening through which, during operation of the apparatus, powder is applied by gravity to a first end (in FIG. 2*a* and FIG. 2*b*, the left end) of the feeding surface 122-A of the feeding chute 122 of the oscillating feeder 120. Inside the powder storage container 110, there are baffle plates/intermediate plates, not shown in the figures, which reduce the static pressure of the powder 112 from the powder storage container 110 onto the feeding chute 122.

The feeding chute 122 of the linear oscillating feeder 120 is, for example, an elongated piece of sheet metal with an elongated chute in its center. In the present embodiment, for example, the chute can be 6 mm wide, 4 mm high and 20 cm long. Depending on the type of powder and the feeding rate to be achieved, the chute can also have other dimensions, in particular smaller dimensions of e.g. 0.5 mm width, 0.1 mm height and 5 cm length of the trough. The linear oscillating feeder 120 further comprises a piezoelectrically or magnetically driven oscillator, for example, with which the feeding chute 122 of the oscillating feeder 120 can be forced to an oscillating movement (vibration movement) perpendicular and parallel to the feeding direction at the same time for feeding the powder 112. The vertical and the parallel oscillating movement are in-phase, wherein the oscillation width corresponds to the distance between the two turning points of the oscillating movement. The oscillating movement therefore has a vertical and a parallel vibration component with respect to the feeding area.

During operation, the feeding area 122-A of the feeding chute 112, on which the powder 112 is fed, is essentially horizontal, i.e. perpendicular to the direction of gravity. Essentially, horizontal includes inclinations of the orthogonal to the feeding area of ±5% or ±3% to the direction of gravity. During operation of the apparatus, the powder is fed on the feeding area in the feeding chute 122 from the first end of the feeding chute 122 to the second end of the feeding chute 122. At the second end of the feeding chute 122, the powder is dispensed to the powder outlet 124.

The housing 123 seals the oscillating feeder 120 with the feeding chute 122 from the environment, e.g. gas-tight manner, wherein the housing comprises an inlet opening for the powder from the powder storage container 110, a gas inlet 125 for the carrier gas and a powder outlet 124 for dispensing a mixture of powder and carrier gas. The gas inlet 125 in the housing 123 can be connected to a gas supply via a mass flow monitor. The mass flow monitor is used to control the mass flow of the carrier gas introduced into the housing. Depending on the application, the carrier gas can be air or an inert gas, such as nitrogen (N2) or argon (Ar). If the powder supplied and dosed with the apparatus should not come into contact with moisture, the use of air is unsuitable and the use of an inert gas is advantageous. A mixture of the carrier gas with the powder dosed by the linear feeder is dispensed through the powder outlet. However, the dosage of the powder is determined solely by the feeding rate of the linear feeder. The mass flow of the carrier gas determines the mass ratio of carrier gas to powder in the gas-powder mixture dispensed through the powder outlet. This mass ratio can be important for a method downstream of the powder supply and dosage, such as a plasma coating method.

In a method for feeding and dosing fine powder, the apparatus described above is used. The fine powder supplied and dosed with the apparatus has a grain size distribution with a D50 value in a range from 0.1 μm to 100 μm. The shape of the powder particles can be nodular, spherical or splattered or the powder particles can have the form of so-called flakes. The powder can consist of a wide variety of materials, in particular a metal, a metal alloy, a polymer, diamonds or ceramics. The powder particles can also be composed of different materials (so-called compound powder). For example, coated powder particles consisting of a core and a coating can be supplied and dosed with the apparatus, wherein the core and the coating are made of different materials.

In one embodiment, the feeding rates achieved with this method are in the range of 0.01 g/min to 50 g/min. Carrier gas between 10 sccm and 80 slm was used. The apparatus and the method for supplying and dosing fine and ultra-fine powders is used in one embodiment to supply the powder to a plasma torch. In this application, the exact dosage of the supplied powder is of great importance. However, the inventive apparatus can also be used for supplying to plants other than a plasma torch.

In the above described embodiment, the feeding area on which the powder is fed by the oscillating feeder is essentially horizontal, i.e. perpendicular to the direction of gravity. It is also possible to feed the powder with a feeding are inclined to the horizontal. In this case, however, the feeding rate is much more dependent on the surface roughness and structuring as well as the morphology of the powder particles (nodular, spherical or spattered shape or so-called flakes). If the feeding area is inclined, a feeding chute adapted to the powder morphology (powder particle shape) may have to be used.

Figure 2C:
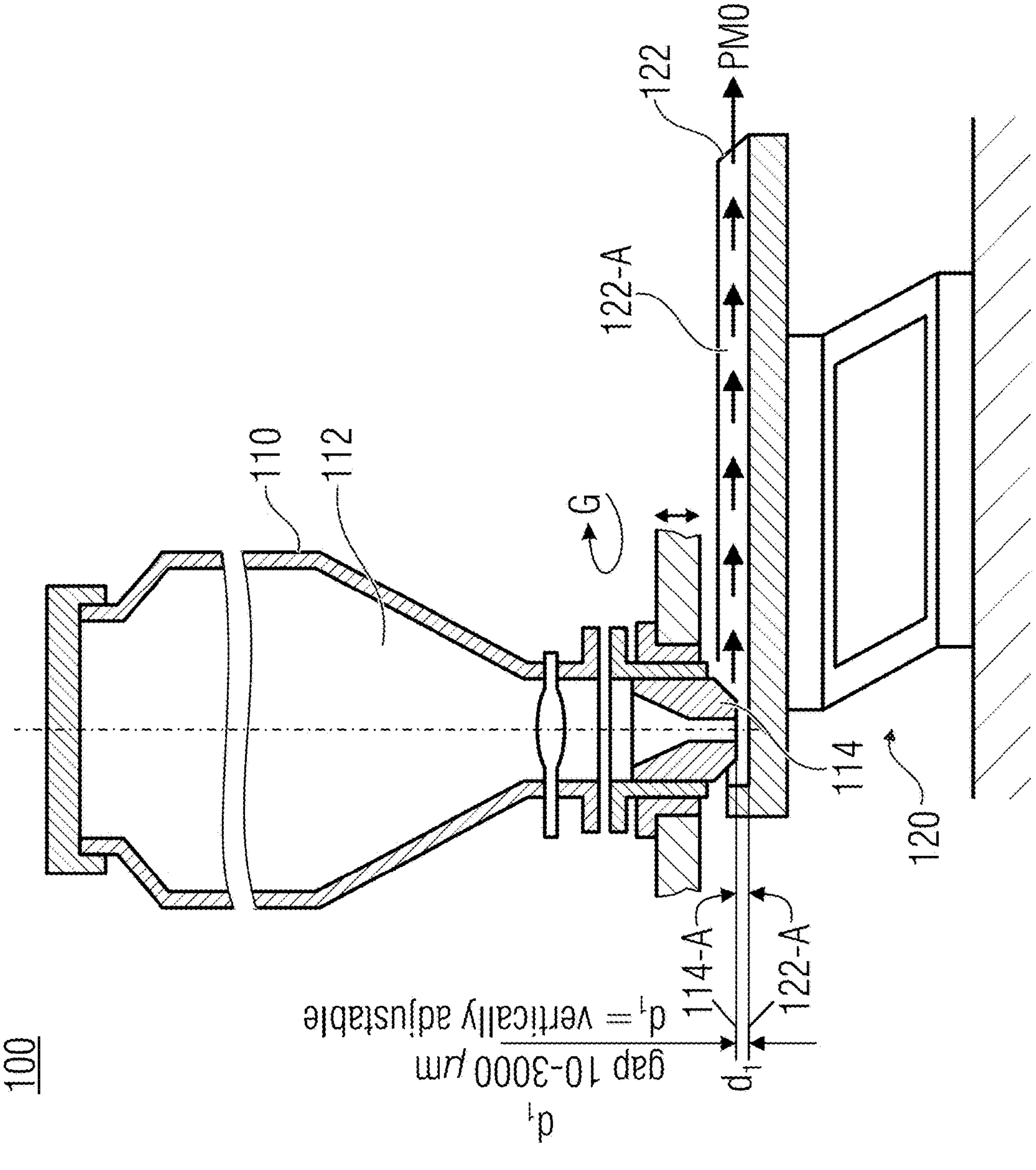
FIG. 2*c* is a partial sectional view of a possible implementation of a distance adjustment between the outlet of the powder storage container and the oscillating feeder for coarse dosing.

FIG. 2*c* shows a partial sectional view of a possible implementation of a distance adjustment between the outlet 114 of the powder storage container 110 and the feeding means 122 of the oscillating feeder 120 for coarse dosing.

According to an embodiment, a distance adjustment means G for adjusting the distance or gap d1 between the outlet end 114-A of the outlet means 114 and the feeding surface area 122-A of the feeding means 122 can be adjusted, for example, to provide a pre-dosage or coarse dosage of the powder quantity PM0 provided by the powder storage container 110 to the feeding means 122 of the oscillating feeder 120. The distance adjustment means for (vertical) adjustment of the distance or gap d1 between the outlet end 114-A of the outlet means 114 and the feeding surface area 122-A of the feeding means 122 can be realized, for example, by means of a thread arrangement G on the outlet means. In addition, a servomotor (not shown in FIG. 2*c*) may be provided on the outlet means 114 or on the powder storage container 110 to adjust the distance d1. Alternatively or additionally, it is also possible to realize the distance adjustment means at the feeding means 122 of the oscillating feeder 120 by means of a mechanical adjustment means or a servomotor.

Depending on the powder properties, e.g. size, density, etc. of the powder particles 112, a deviation of about 10 to 50% from the powder quantity PM0 or target feeding rate to be provided by the powder storage container 110 to the feeding means 122 of the oscillating feeder 120 can be obtained during pre-dosage or coarse dosage. In this way, the fine adjustment of the target feeding rate to be performed by the control means 150 can be supported or simplified with an accuracy of at least 80%, 90%, 95%, 98% or 99% of the target feeding rate.

Figure 3A:
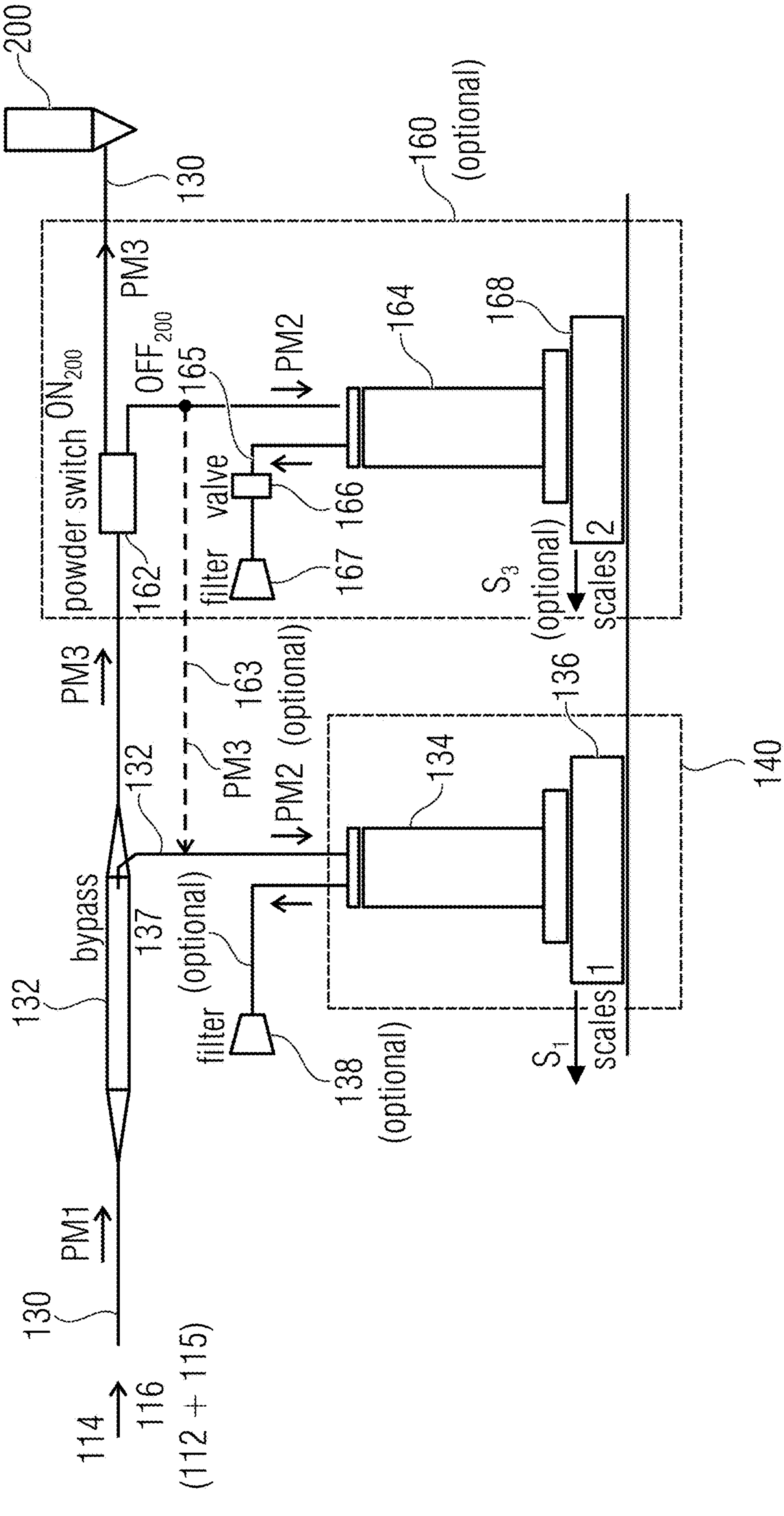
FIG. 3*a-b* are schematic block diagrams of the powder quantity measuring arrangement and the associated decoupling means in the conduit arrangement according to an embodiment.
Figure 3B:
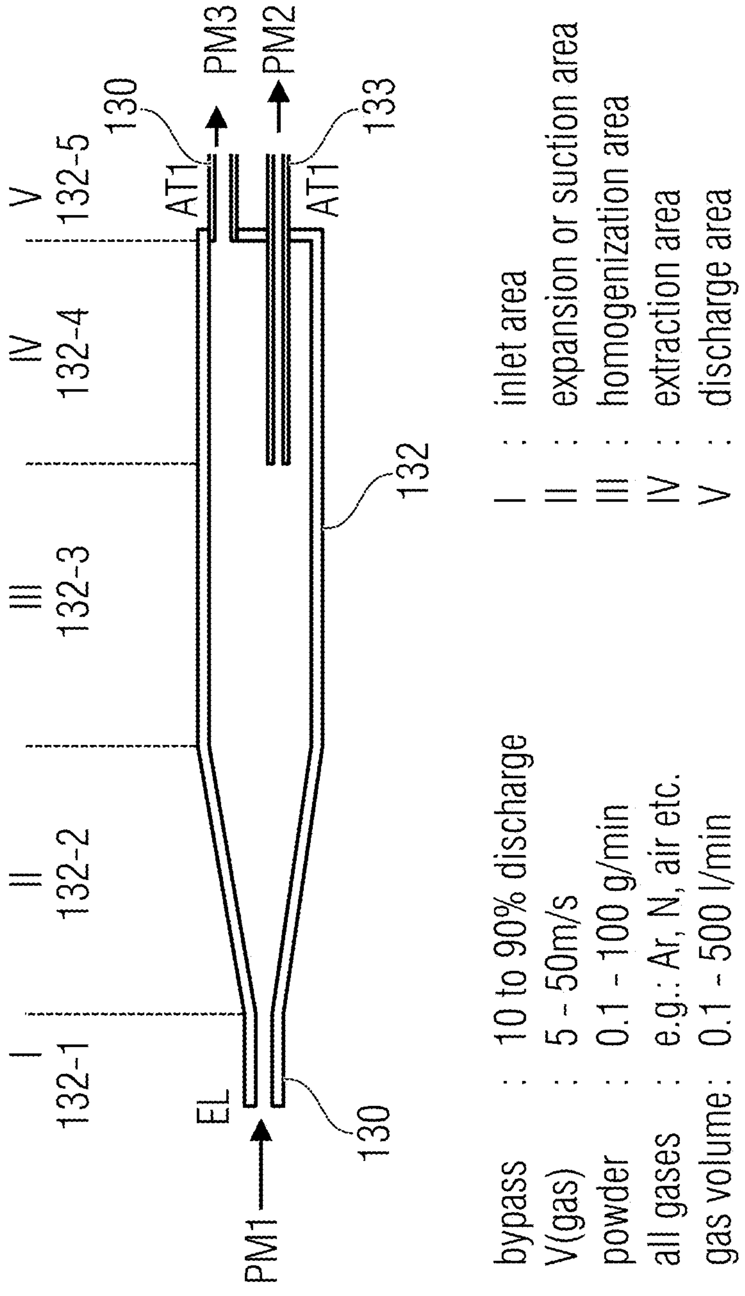

FIG. 3*a*-*b* show a schematic block diagram of the powder quantity measuring arrangement 140 and the associated decoupling means 132 in the conduit arrangement 130 according to an embodiment.

The apparatus 100 comprises the conduit arrangement 130 for feeding the powder 112 dispensed by the oscillating feeder 120 in a feeding gas 115 as a powder-gas mixture 116 and for supplying the powder-gas mixture 116 to the powder processing means 200, which may be configured, for example, as a plasma coating arrangement or plasma nozzle 200 for plasma spraying. Further, the conduit arrangement 130 comprises the decoupling means or the bypass 132 to decouple or extract a defined proportion or a defined powder quantity PM2 of the powder 112 from the powder-gas mixture 116.

The apparatus 100 further comprises the powder quantity measuring arrangement 140 for detecting the decoupled powder quantity per unit time and for providing the powder quantity information signal S1 based on the decoupled powder quantity PM2 per unit time. The decoupling means 132 is configured such that the extracted powder quantity PM2 per unit time has a predetermined ratio to the fed powder quantity PM1 (total powder quantity) of the oscillating feeder 120 within a tolerance range and thus also to the powder quantity PM3 (=fed powder quantity PM1 minus extracted powder quantity PM2) per unit time supplied from the conduit arrangement 130 to the powder processing means 200.

According to an embodiment, the powder quantity measuring arrangement 140 is configured to detect or determine the weight of the decoupled powder quantity PM2 per unit time based on the extracted or decoupled powder quantity PM2 per unit time. Based on the detected weight of the decoupled powder quantity per unit time, the powder quantity information signal S1 can then be provided by the powder quantity measuring arrangement 140 to the control means 150.

As shown in FIG. 3*a*, the powder quantity measuring arrangement 140 can comprise a load cell or scales to "directly" detect the weight (or mass) of the decoupled powder quantity PM2 per unit time and provide the powder quantity information signal S1 to the control means 150.

As shown in FIG. 3*a* as an example, the powder quantity PM2 per unit time is decoupled from the powder-gas mixture 116 by means of the decoupling means 132 and supplied, for example, to a powder storage container 134, wherein the change in quantity of the decoupled powder quantity PM2 per unit time in the powder storage container 134 is detected by the load cell 136 and a corresponding powder quantity information signal S1 is provided to the control means 150. As further illustrated in FIG. 3*a*, the powder storage container may further comprise an optional outlet line 137 to a filter element 138 which provides a defined escape of the feeding gas 115 to maintain a constant feeding gas pressure in the system or the conduit arrangement 130.

As further illustrated in FIG. 3*a*, a powder switch arrangement 160 can be optionally provided in feeding direction after the decoupling means 132. The optional powder switch arrangement 160 can, for example, include a powder switch 162, a further powder storage container 164, an outlet conduit 165, a valve 166 and a further filter element 167. Further, a further load cell 168 can be provided to receive and store or temporarily store the powder quantity PM3 decoupled from the powder switch 162. Further, the further optional load cell 168 can be provided to detect the temporarily stored powder quantity PM3 per unit time and to provide a corresponding information signal S3 of the powder quantity PM3 for evaluation to the control means 150. The powder switch 162 is configured to supply the powder quantity PM3 to the plasma nozzle 200 in a first operating state, e.g. an on operating state $ON_{200}$ of the plasma nozzle 200, and to supply the powder quantity PM3 (exclusively) to the further powder storage container 164 in a second operating state $OFF_{200}$, e.g. in an off state of the plasma nozzle 200. Optionally, the powder switch arrangement 162 can also be configured to supply the powder quantity PM3 dispensed in the off-state also in the first powder storage container 134, as shown for example by the optional connecting conduit 163 in FIG. 3*a*. If the optional connecting conduit 163 is provided, the function of the further powder storage container 164 and the further load cell 168 can be performed by the powder storage container 134 with the load cell 136 or replaced by these elements.

With the further optional load cell 164, the powder quantity PM3 per unit time can now be determined during the off-operating state of the plasma nozzle 200, for example, so that, for example, recalibration of the powder decoupling means 132 can be performed by comparing the powder quantity PM2 per unit time decoupled by the powder decoupling means 132 with the determined powder quantity PM3 per unit time, so that the exact decoupling ratio of the powder quantity decoupling means 132 between the supplied powder quantity PM1 and the (in the off-state $OFF_{200}$) decoupled powder quantity PM3 per unit time can be exactly determined and optionally a recalibration can be performed.

According to an embodiment, the powder switch arrangement 160 is thus arranged in the conduit arrangement 130 in the flow direction of the powder-gas mixture 116 downstream of the decoupling means 132, wherein the powder switch arrangement 160 is configured to determine the powder quantity PM3 present in the conduit arrangement 130 downstream of the decoupling means 132 during an operating break $OUT_{200}$ of the powder processing means 200 and to provide a further powder quantity information signal S3 of the powder quantity PM3 for evaluation to the control means 150.

The control means 150 is now, for example, further configured to determine or calibrate the actual proportion PM2 of the powder 112 extracted from the powder-gas mixture 116 by the decoupling means 132 in the conduit arrangement 130, based on the further powder quantity information signal S3 provided by the powder switch arrangement 160.

Based on the decoupling means or bypass 132, as shown in FIG. 3*a*, for decoupling a defined proportion or a defined powder quantity PM2 of the powder 112 from the powder-gas mixture 116 and the detection of the decoupled powder quantity PM2 by means of the powder quantity measuring arrangement 140, a continuous control of the discharge rate or feeding rate of the powder quantity PM3 supplied to the powder processing means 200 per unit time, can be performed both outside and during the actual coating process.

In addition, an improvement in the feeding stability of the supplied powder quantity PM3 can be obtained, since less moisture absorption and less aging of the powder is achieved due to sealing the powder storage container during the coating process. Further, according to the present concept, a very high total powder discharge or supplied powder quantity PM3 can be obtained. Further, pressure variations of the feeding gas 115 in the conduit arrangement 130 can be avoided by the powder switch arrangement 160. Finally, relatively long process times for performing the plasma coating or plasma spraying with the plasma nozzle 200 up to a refill of the powder storage container 110 can be performed, since the powder introduced in the powder storage container 134 can be returned to the powder storage container 110 regularly. The process duration is essentially limited only by the weighing range of the load cell 136 of the powder quantity measuring arrangement 140.

Based on the powder switch arrangement 160 with the powder switch 162, the powder quantity PM3 per unit time or the total powder quantity PM1 as a combination of the partial powder quantities PM2+PM3 (=decoupled powder quantity PM2+supplied powder quantity PM3) can be determined, for example, during operating breaks of the powder processing means 200, i.e. during the second operating state $OFF_{200}$. Thus, the output ratio of the powder quantity extraction means 132 between the supplied powder quantity PM1 and the actually decoupled powder quantity PM2 can be determined exactly, so that, for example, a start calibration of the feeding apparatus 100 can be carried out before the start of the powder processing process or in operating breaks of the powder processing means 200, a recalibration of the feeding quantity of the oscillating feeder 120 of the feeding apparatus 100 can be carried out. In particular, calibration of the decoupling means 132 or the decoupled powder quantity PM2 in relation to the supplied powder quantity PM1 or the powder quantity PM3 per unit time can be performed.

FIG. 3*b* shows an exemplary configuration in the form of a schematic representation of the decoupling means 132 in the conduit arrangement 130 according to an embodiment.

As illustrated in FIG. 3*b*, the decoupling means 132 can initially have an inlet area 132-1 in the flow direction of the powder-gas mixture 116, where the powder quantity PM1 per unit time is supplied to the decoupling means 132. Following that, the decoupling means 132 comprises an expansion or suction area 132-2, for example. Downstream in the flow direction is the homogenization area 132-3. The expansion area 132-2 and the subsequent homogenization area 132-3 ensure a "laminar" flow of the powder-gas mixture 114 with the powder quantity PM1 before the extraction or powder decoupling. The expansion area 132-2 and the subsequent homogenization area 132-3 should in particular ensure a predetermined (e.g. Gaussian distribution) or even distribution of the powder 112 over the cross-section (perpendicular to the flow direction) of the extraction means 132, so that a defined proportion PM2 of the powder quantity PM1 supplied to the extraction means 132 per unit time can be extracted in the extraction area 132-4. Thus, a defined sample, i.e., the powder quantity PM2 per unit time, is extracted from the laminar gas-powder flow 116 in the decoupling area or extraction area 132-4 and supplied to the powder quantity measuring arrangement 140 (not shown in FIG. 3*b*). The resulting partial flow of the powder-gas mixture 116 with the powder quantity PM3 can then be supplied to the coating process or the plasma nozzle 200 for plasma spraying. The further gas flow with the powder quantity PM2 is then supplied to the evaluation system, i.e. the powder quantity measuring arrangement 140.

As illustrated in FIG. 3*b*, the decoupling means 132 is configured to extract a predefined proportion PM2 or the predefined ratio "PM2/PM1=PM2/(PM2+PM3)" of the powder quantity PM1 in the powder-gas mixture 116, which is dispensed by the oscillating feeder 120 at the powder outlet 124 and transported in the conduit arrangement 130. For example, the decoupling means 132 as a conduit or pipe section of the conduit arrangement 130 can be provided with a decoupling path 133. In particular, the decoupling means 132 can be divided into different volume sections along the flow direction of the powder-gas mixture to achieve a homogeneous distribution of the powder-gas mixture in the decoupling means 132, so that the predetermined ratio between the extracted powder quantity PM2 per unit time and the fed powder quantity PM1 of the oscillating feeder or the powder quantity PM3 supplied to the powder processing means 200 is maintained as accurately as possible. According to an embodiment, the decoupling means 132 can comprise an inlet area, an expansion area, a homogenization area, a decoupling area and an output or compression area in the flow direction of the powder-gas mixture.

According to the powder decoupling means 132 arranged in the conduit arrangement 130 and the downstream powder quantity measuring arrangement 140, a continuous gas-powder flow 116 can thus be monitored and regulated (controlled) during the coating process.

According to an embodiment, the powder discharge or the powder quantity PM3 per unit time of the powder decoupling means 132 can be 10 to 90% of the supplied powder quantity PM1. The carrier gas velocity can be in a range of 5-50 m/s, for example. The powder quantity PM3 per unit time can be in the range of 0.1 to 100 g per minute. Basically all gases, such as argon, nitrogen, air, etc. can be used as carrier gas. The gas volume or gas throughput can, for example, be in a range of 0.1 to 500 liters per minute.

According to another embodiment (not shown in FIG. 3*a-b*), the powder quantity measuring arrangement 140 can be configured to optically detect the number of decoupled powder particles 112 and to provide the powder quantity information signal S1 with the number of decoupled powder particles to the control means 150. According to a further embodiment, the powder quantity measuring arrangement 140 can be configured to optically detect the number and for example the (average) size of the decoupled powder particles 112 and to provide the powder quantity information signal S1 with the number and average size of the decoupled powder particles to the control means 150.

Based on the number and size of the decoupled powder particles, the volume of the decoupled powder quantity PM2 per unit time can be determined, wherein based on the determined volume of the decoupled powder quantity per unit time and further on the (e.g. predetermined) material density of the used powder particles, the weight of the decoupled powder quantity PM2 per unit time can be determined. Determining the volume and/or the weight of the decoupled powder quantity PM2 per unit time can take place in the powder quantity measuring arrangement 140 or also in the control means 150.

Figure 4:
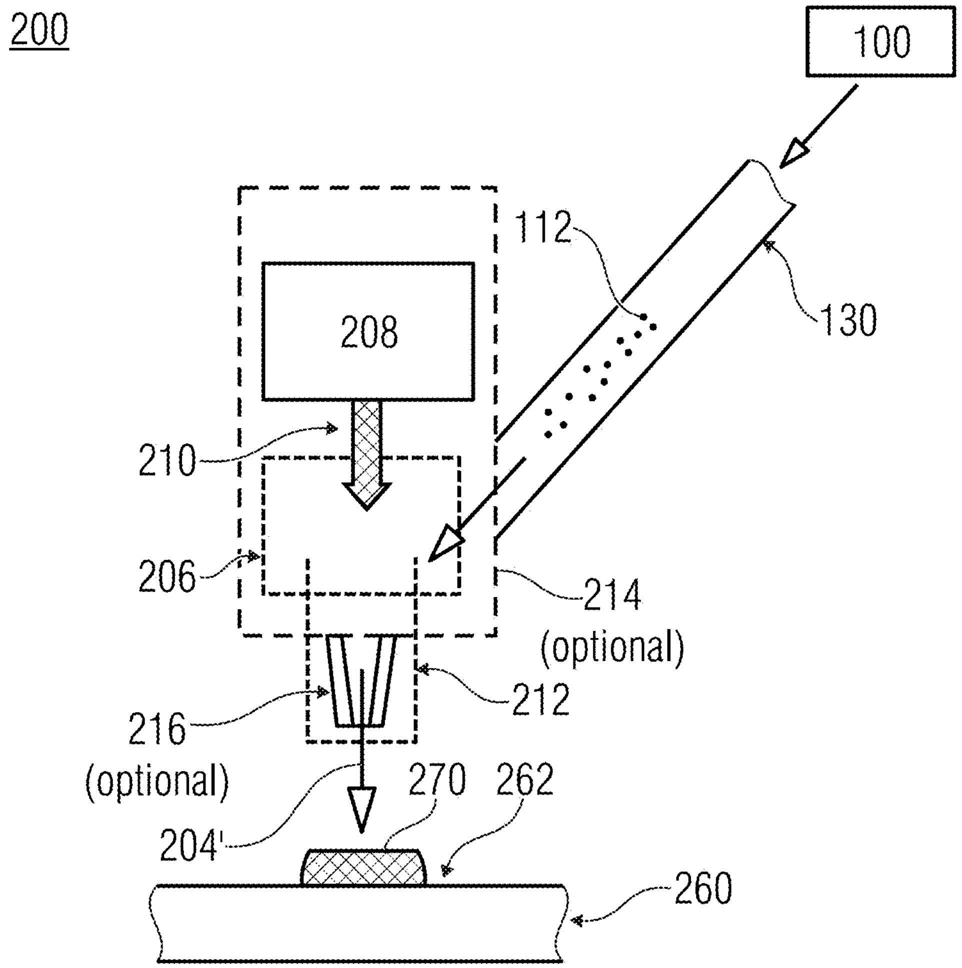
FIG. 4 is a schematic block diagram of an apparatus for producing a layer structure on a surface area of a device according to an embodiment.

FIG. 4 shows a schematic diagram of the plasma coating arrangement or plasma nozzle 200 for plasma spraying for the production of a layer structure 270 on a surface area 262 of a device 260 according to an embodiment.

The powder feeding means 100 of FIGS. 1, 2*a-c* and 3*a-c* is configured to provide or feed the powder particles 112, e.g. from the powder reservoir 110 (not shown in FIG. 4) to a process area 206. Further, a plasma source 208 is provided to introduce a plasma 210, e.g. in the form of a plasma jet, to the process area 206 and to thermally activate the powder particles 112, which are provided there and pass through process area 206, with the plasma 210. The "plasma activation" causes, for example, a reduction in viscosity or a change in the current aggregate state of at least part of the powder particles 112.

In plasma activation, for example, the powder particles 112 are supplied directly to an arc discharge zone, i.e. a high-energy plasma zone, wherein the powder particles 112 can absorb the intense plasma energy, resulting in liquefaction (at least in a viscous state) of the material of the powder particles 112. Other arrangements can also be used to generate the thermal plasma, as will be discussed below.

The apparatus 200 further comprises an optional application means 212 (e.g. an outlet nozzle) for applying the activated powder particles 112 to the surface area 262 of the device 260 to obtain the layer structure 270 containing the particles 112 on the surface area 262 of the device 260. The application means 212 is considered to be the portion of the apparatus 200 that effects the transfer of the activated powder particles 112 from the process area 206 to the surface area 262 to be treated. For example, if the process area 206 is located in an (optional) housing 214, the application means 212 can optionally be configured as an outlet opening or as a nozzle arrangement 216 to orient the activated powder particles 112 in the direction of the surface area 262 of the device 260 to be treated and to apply them thereon.

In the inventive apparatus 200 for the production of a layer structure 270, essentially any plasma source 208 can be used to introduce the plasma 210 in the process area 206. For example, atmospheric pressure plasma sources or normal pressure plasma sources can also be used, in which the pressure in the process area 206 can approximately correspond to that of the surrounding atmosphere, i.e. the so-called normal pressure. The advantage here is that atmospheric-pressure plasmas do not need a (closed) reaction vessel that ensures that a pressure level or gas atmosphere different from atmospheric pressure is maintained. Different types of excitation can be used to generate the plasma, such as alternating currents excitation (low-frequency alternating currents), exciting alternating current in the radio wave range (microwave excitation) or direct current excitation.

For example, a high-voltage discharge (5-15 kV, 10-100 kHz) can be used to generate a pulsed arc, wherein the process gas flows past this discharge path, is excited there and transferred to the plasma state. This plasma 210 is brought into contact with the powder particles in the process area 206, so that the powder particles are activated by the plasma 210. The activated powder particles 112 are then led out of a housing opening (e.g. a nozzle head) to the surface area 262 of the device 260 to be treated.

In particular, for example, the layer structure 270 consisting of a large number of particles applied and distributed in a controlled manner or a uniform layer structure 270 (in the form of a coating) can be formed on the surface 262 of the device 260 to be treated.

Figure 5A:
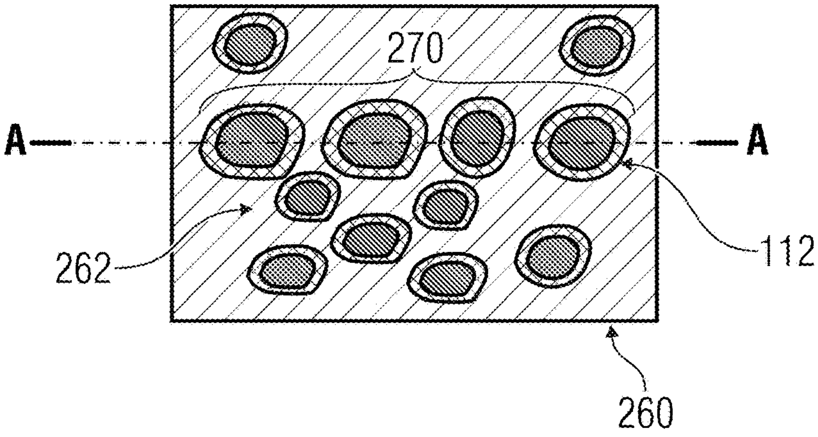
FIG. 5*a-c* are schematic representations in a top view, a sectional view and a perspective view of an applied layer structure on a surface area of the device according to an embodiment.
Figure 5B:
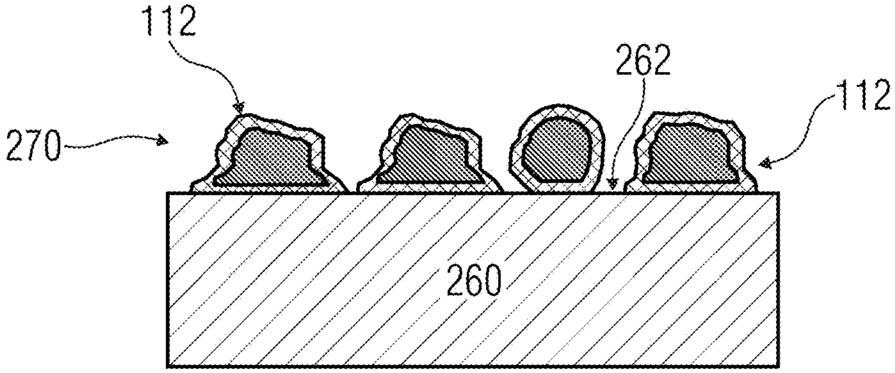
Figure 5C:
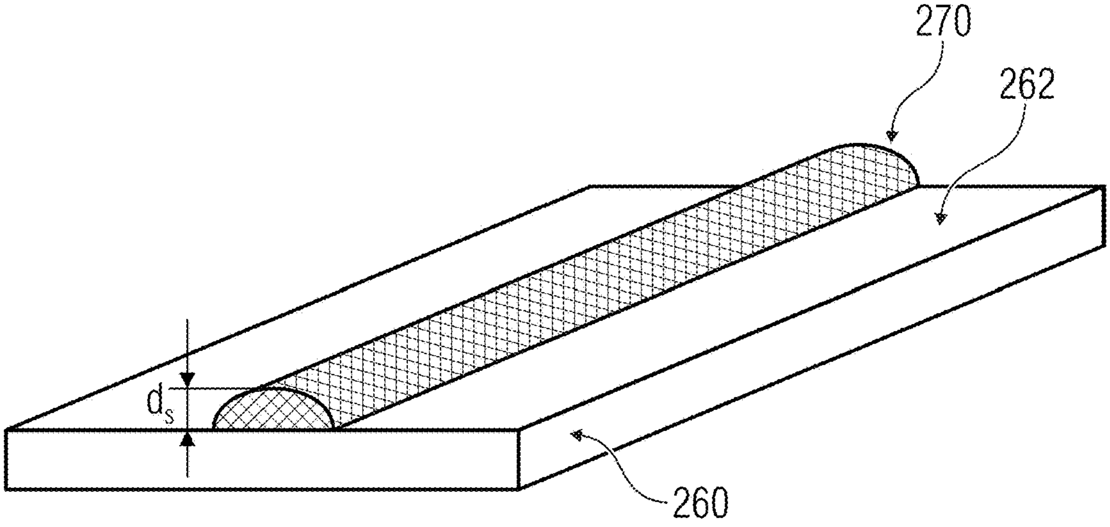

FIG. 5*a*-*c* show schematic representations in a top view, a sectional view and a perspective view of an applied layer structure 270 on a surface area 262 of the device 260 according to an embodiment.

In this context, FIG. 5*a*-*b* show a schematic sectional view or top view of some of the particles 112 applied in a controlled manner on the treated surface area 262 (in the form of a small section) of the device 260 to be coated. The particles 112 can be firmly and/or materially bonded or fused to the surface area 262 of the device 260 during application or impact on the surface area 262 of the device 260, for example, under the influence of the plasma beam, to form the layer structure or coating 270 on the surface area 262 of the device 260 to be treated.

For example, the particles 112 (particle nuclei) have an average diameter of 0.1 μm to 100 μm, 1 μm to 100 μm or 20 μm to 80 μm. The desired average diameter of the particles 112 is obtained by specifying the desired electrical, dielectric and/or mechanical properties of the resulting layer structure or coating 270 on the surface area 262 of the coating carrier 260 to be treated.

The material of the particles/particle nuclei 112 can, for example, contain a metal, such as copper Cu, a polymer or a carbon compound. For example, the material of the particles 112 can comprise, e.g., copper, tin, nickel, etc. to create a continuous (e.g. conductive) coating.

The applied layer structure 270, for example, may be non-continuous, with particles 112 arranged with an occupancy of, for example, 5% to 50% (or, for example, 2% to 95%, 3% to 80% or 3% to 30%) of the surface area distributed over the treating surface area 262 of the device 260. In this regard, reference is made to FIG. 5*a*-*b*, which shows schematic illustrations in a top view and sectional view (along the section line AA) of an applied layer structure 270 on the surface area 262 of the device 260.

For example, the occupancy or distribution stated above refers to a (single) crossing process (treatment process) of the surface area to be "coated". The crossing process of the surface area to be "coated" can also be repeated several times, for example, to obtain the desired resulting occupancy density (up to 100%) of the surface area with the powder particles.

The layer resistance or area resistance of the resulting layer structure 270 on the surface area 262 of the device 260, which is applied by plasma spraying, can thus be precisely adjusted in certain areas. Further, the conductivity of the plasma-coated area can be increased or adjusted accordingly by an increased material application of conductive powder particles 112.

Alternatively, the applied layer structure can also form a continuous coating 270 on the surface area 262 of the device 260 to be treated. In this context, reference is made to FIG. 5*c*, which shows exemplarily a schematic perspective illustration of an applied coating 270 on the surface area 262 of the device 260.

In other embodiments, the crossing process (treatment process) of the surface area to be "coated" can be repeated (several times) for as long as needed, for example to obtain a homogeneous (essentially void-free) layer structure, wherein resulting layer thicknesses $d_s$ of several μm to several 100 μm can be built up.

FIG. 6*a*-*e* show schematic illustrations in a top view of a planar heating element 300 in the form of planar, electrically conductive resistor layer structures 270-*n* applied by means of a plasma coating on a surface area 262 of a device 260 according to an embodiment.

According to an embodiment, the planar heating element 300 comprises an electrical heating resistor element 270-3 and a first and a second planar, electrically conductive layer area 270-1, 270-2, wherein the electrical heating resistor element 270-3 is arranged between the first and second planar, electrically conductive layer areas 270-1, 270-2. The first planar, electrically conductive layer area 270-1 is arranged as a first contact terminal area at least in areas on a first edge area of the electrical heating resistor element 270-2 and is electrically connected and materially bonded to the same, wherein the second planar, electrically conductive layer area 270-2 is arranged as a second contact terminal area at least in areas on a second edge area of the electrical heating resistor element 270-3 and is electrically connected and materially bonded to the same, wherein the first and second planar, electrically conductive layer areas 270-1, 270-2 have a conductivity that is at least twice, at least five times, at least ten times or at least one hundred times as high as that of the electrical heating resistor element 270-3.

The first planar, electrically conductive layer area 270-1 is thus at least in areas or completely superimposed or overlapping with the first edge area of the electrical heating resistor element 270-2 on the electrical heating resistor element 270-2 and is electrically connected and materially bonded to the same, wherein the second planar, electrically conductive layer area 270-2 is arranged as a second contact terminal area at least in areas or completely superimposed or overlapping with the second edge area of the electrical heating resistor element 270-3 on the electrical heating resistor element 270-3 and is electrically connected and materially bonded to the same.

According to an embodiment, the first and second planar, electrically conductive layer areas 270-1, 270-2 are applied to the surface area 262 of the device 260 with the electrically conductive heating resistor element 270-3 by means of plasma coating or plasma spraying.

The first planar, electrically conductive layer area 270-1, which acts as a contact terminal area, can, for example, also be formed from several partial layer areas arranged separately from one another, provided that the partial areas are electrically connected to one another, i.e. are at essentially the same potential when energized. This is equally applicable to the second planar, electrically conductive layer area 270-2 which acts as a second contact terminal area.

According to an embodiment, the electrical heating resistor element 270-3 can also be configured as a planar resistor structure applied by means of a plasma coating.

According to an embodiment of the planar heating element 300, the first and second planar, electrically conductive coating areas 270-1, 270-2 can be applied to the surface area 262 of the device 260 with the electrical heating resistor element 270-3 by means of a plasma coating or by plasma spraying, as described above. According to an embodiment, the electrical heating resistor element 270-3 can also be formed as a planar resistor structure applied by means of plasma coating.

In the planar heating element 300 or its production process, the area resistance of the different layer areas 270-1, 270-2, 270-3 can be adjusted in a defined manner by adjusting or precisely dosing the concentration of conductive material during plasma application of the layer areas. In particular, the planar resistor structure 270-3, which is configured as an electrical heating resistor element and can be applied by means of a plasma coating, can thus be adapted to the desired heating power and the power coupling needed for this.

The layer areas 270-1, 270-2 can be connected to the applied resistor layer structure 270-3 by arranging the layer areas 270-1 or 270-2 superimposed with the applied resistor structure 270-3, so that a planar transition is obtained between the layer areas 270-1 or 270-2, which are configured as contact terminal areas, and the layer structure 270-3, which is applied as electrical heating resistor element.

By plasma spraying by means of the plasma coating arrangement or plasma nozzle according to the present concept, the electrical heating resistor element 270-3 can also be applied as a planar resistor structure, applied by means of a plasma coating, to the surface area 262 of the device 260 and materially bonded to the same. Any desired structure of the electrical heating resistor element between the contact terminal areas, e.g. linear, crossing, meandering, etc. can be created, wherein the resulting geometry of the planar, conductive structure(s) can be adjusted according to the application.

According to an embodiment, the first and second contact terminal areas 270-1, 270-3 and the planar, electrically conductive layer area 270-3 can be integrally formed with the surface area 262 of the device 260.

The planar resistor structure 270-3 is thus configured, for example, to convert electrical energy into thermal energy as the electrical heating element when the same is energized.

According to an embodiment, the first and second planar contact terminal areas 270-1, 270-2 can be configured as a solderable metal layer. A highly conductive material, e.g. a metal or a metal alloy, can be applied as a layer structure to the surface area of the device as contact areas, wherein these highly conductive contact area structures can be formed suitable for a solder connection. If, for example, the metal layer has a copper material etc. as a main component, a common solder can be used to "solder" a lead wire to the respective planar contact terminal area.

According to an embodiment, the planar heating element 300 can be tile-shaped and can be electrically connected in series or in parallel to a number of adjacent, additional planar heating elements 300.

According to embodiments, the planar heating element can be polygonal or rectangular, wherein the first and second planar contact terminal areas 270-1, 270-2 are formed on opposite edge areas 270-3A, 270-3B of the electrical heating resistor element 270-3.

According to an embodiment, perforations or vias 272 passing through the device can be provided in the surface area 262 of the planar device 260. The perforations 272 can be provided in the surface area 262 of the planar device 260 to provide air flow through the perforations of the planar device 260 and to heat the air flow through the planar device 260 when the electrical heating resistor element 270-3 is energized.

According to an embodiment, the planar, electrically conductive layer area of the electrical heating resistor element 270-3 can have a uniform area resistance to provide a uniform heating effect on the surface area 262 of the planar device 260.

Figure 6A:
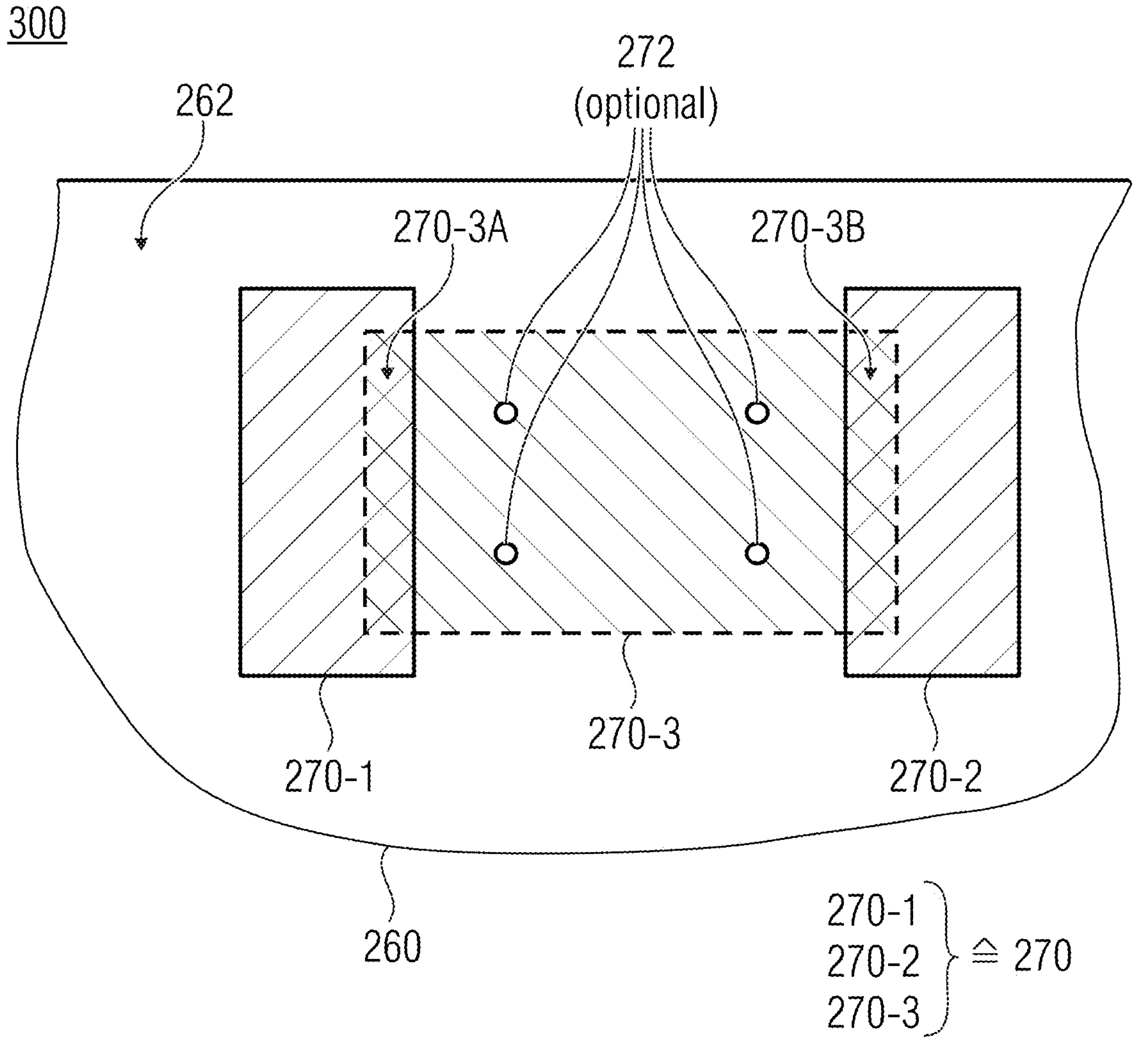
FIG. 6*a-e* are schematic representations in a top view of a planar heating element in the form of a planar, electrically conductive resistor layer structure applied by plasma spraying on a surface area of a device according to an embodiment.

As exemplarily shown in FIG. 6*a*, the electrical heating resistor element 270-3 can have an even layer distribution except for the optional perforations 272, so that when the electrical heating resistor 270-3 is energized, the electrical heating resistor element 270-3 is heated evenly outside the overlap area with the contact terminal areas 270-1, 270-2.

According to an embodiment, the planar, electrically conductive layer area 270-3 of the electrical heating resistor element 270-3 can have a predetermined distribution of the area resistance on the surface area 262 of the planar device 260 to obtain a heating effect of the planar heating element at the surface area 262 of the device 260 that differs in some areas when the electrical heating resistor element 270-3 is energized.

FIGS. 6*b-e* are used to illustrate some possible geometric configurations of the electrical heating resistor element 270-3 between the two contact terminal areas 270-1, 270-2 in the form of schematic illustrations in a top view. The following illustration of different geometric configurations of the electrical heating element 270-3 is only exemplary and not conclusive, since essentially any configurations and geometric configurations of the electrical heating resistor element 270-3 and the contact areas 270-1, 270-2 can be used, which are adapted to the respective application.

Figure 6B:
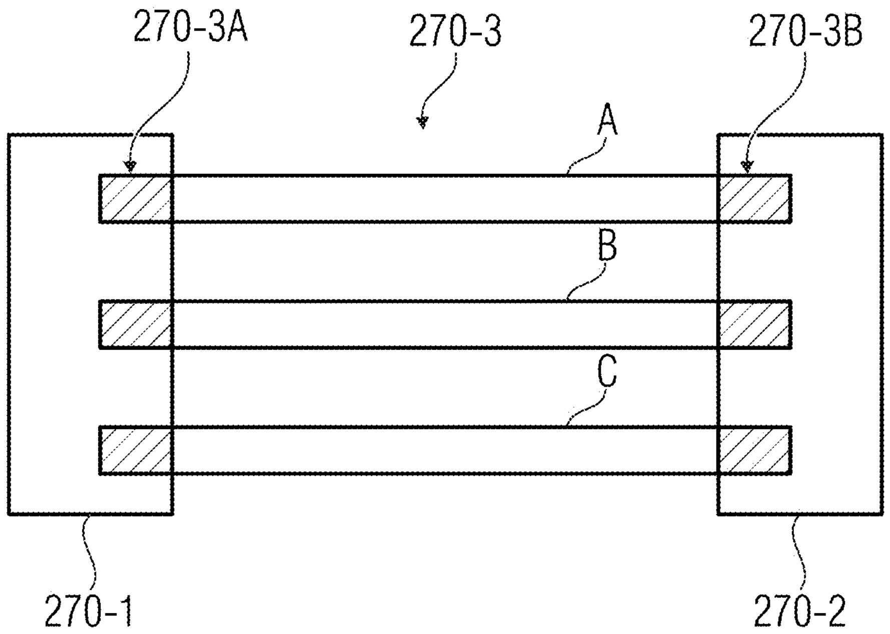

As shown in FIG. 6*b*, the electrical heating resistor element 270-3 can be divided into a plurality of conductor strips A, B, C, for example, arranged in parallel between the two contact terminal areas 270-1, 270-2. If the linear layer areas A, B, C of the layer structures 270-3 applied as electrical heating element have the same layer resistance, energizing the layer areas A, B, C will result in an essentially identical heating effect of the strip structures A, B, C of the electrical heating resistor element 270-3. If, on the other hand, the different conduit elements of the electrical heating resistor element 270-3 have different layer resistances, a different heating effect of the planar, for example parallel heat conductor strips of the electrical heating resistor element 270-3 can be achieved with the same energization of the same.

Figure 6C:
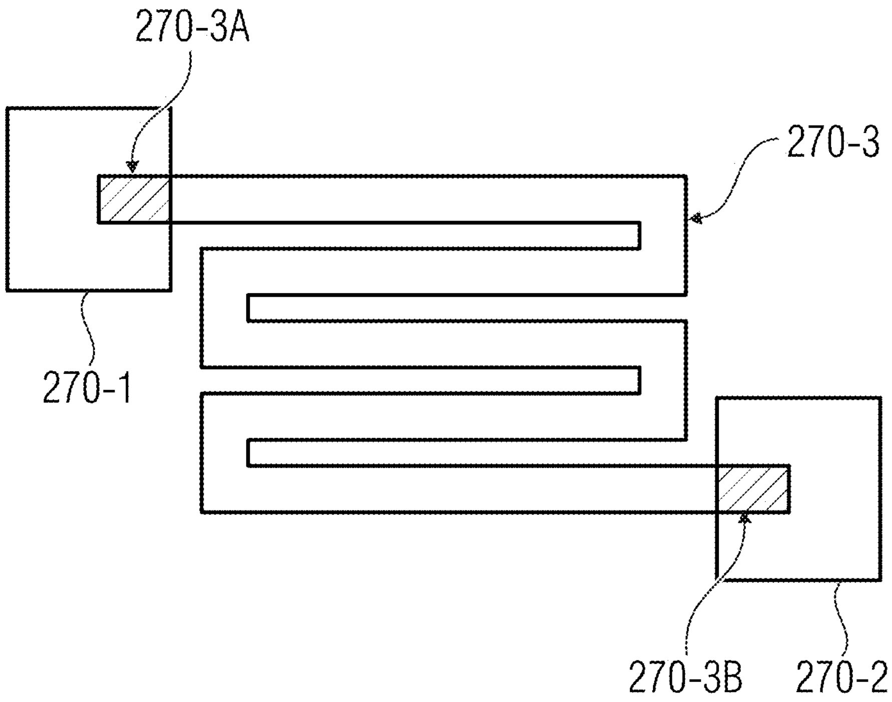

As shown exemplarily in FIG. 6*c*, the electrical heating resistor element 270-3 can be configured in a meander shape between the two contact terminal areas in areas 270-1, 270-2.

Figure 6D:
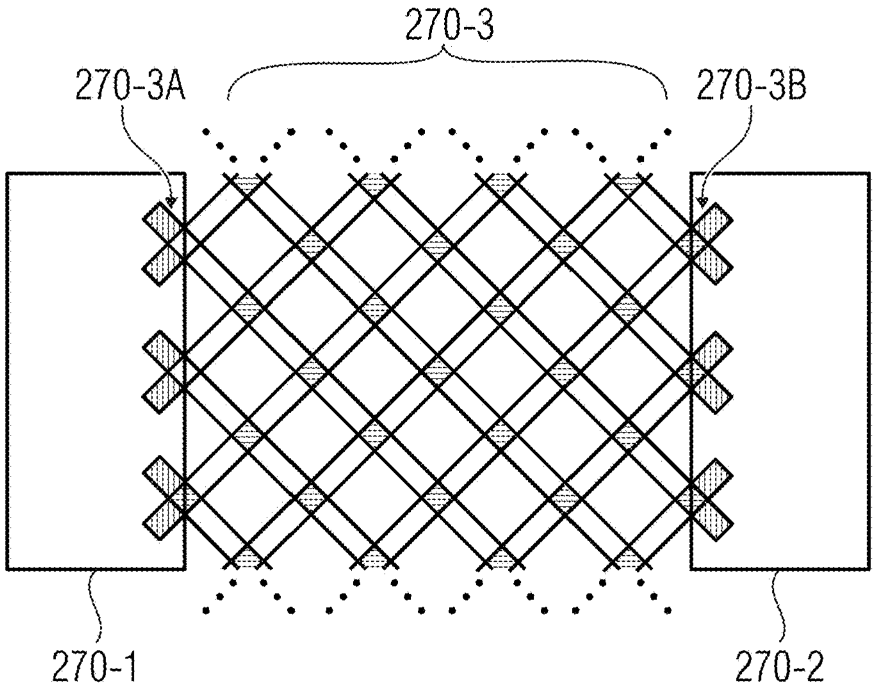

As shown exemplarily in FIG. 6*d*, the electrical heating resistor element 270-3 can comprise a plurality of crossing conductive trace structures between the two contact terminal areas 270-1, 270-2, so that the electrically conductive layer area of the electrical resistor element 270-3 can be configured as a grid or mesh structure. Due to the large number of crossing points D of the individual conductor areas, the functionality of the entire electrical heating resistor element 270-3 can still be maintained despite an interruption of, for example, a single conductor area.

Figure 6E:
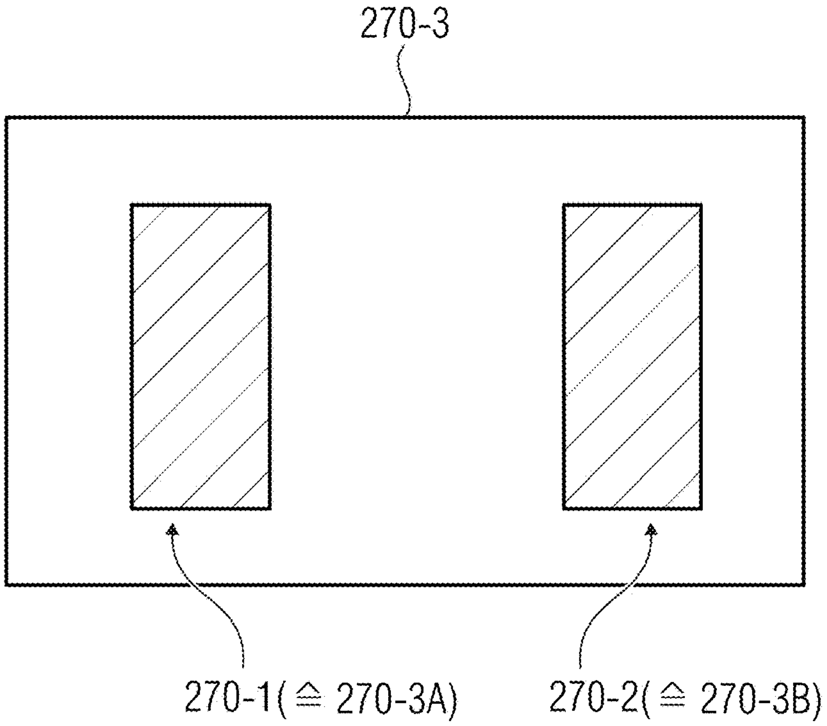

FIG. 6*e* shows exemplarily, in a schematic illustration of a top view of the planar heating element 300, an electrically conductive resistor structure 270-3, wherein the contact terminal areas 270-1, 270-2 are arranged exemplarily as elongated areas or islands within the resistor structure of the electrical heating element 270-3, for example at edge areas of the same. Since the highly conductive contact area structures 270-1, 270-2, for example, are configured to be suitable for a solder connection, the contact islands 270-1, 270-2 can be connected directly to a lead wire (not shown in FIG. 6e) for electrical power supply or energization using a common solder material.

The resistor structure can, for example, be configured as a planar, electrically conductive resistor layer structure applied by plasma spraying or also as a conductive solid body with essentially any configuration made of a conductive material. Further, the first and second planar, electrically conductive layer areas, which are effective as contact surface areas 270-1, 270-2, have a conductivity that is at least twice, at least five times, at least ten times or at least 100 times as high as the material of the electrical resistor element 270-3.

With regard to the exemplary configurations of the electrical heating resistor element 270-3 described in FIGS. 6a-e, it should be made clear that the different embodiments are shown only for clarification and are not intended to be a conclusive list of the possible geometric configurations of the electrical heating resistor element 270-3.

According to an embodiment, the electrical conductive resistor element 270-3 can also be configured as a heating wire.

According to an embodiment, the planar heating element 300 can be configured as a surface area of an interior panel of a motor vehicle. Further, the planar heating element can be configured as a surface area of a garment.

As already mentioned above, the planar heating element, which is produced, for example, by plasma-induced layer application, can be used in a variety of applications.

Thus, the planar heating element 300 described above can be used for heating and ventilation in the automotive sector according to embodiments. Further, the planar heating element 300 can be used, for example, as seat heating in motor vehicles, ski lifts, airplanes, etc., i.e. in any seating arrangement for persons. Further, the planar heating element 300 can be used in the automotive sector as steering wheel heating, roof liner heating, heating of decorative trims or heating of any surfaces in the interior of a vehicle and also in the trunk of the vehicle. Further, an application of the planar heating element 300 is also conceivable as heating of furnishing objects, for example as a layer structure on surfaces such as wood, veneer, plastic, metal, glass, etc. Further, the planar heating element 300 can also be used in a building, for example as a "heatable wallpaper".

Further, the application of the planar heating element 300 is also conceivable for garments, to make garments heatable at least in certain areas. Thus, the planar heating element can be installed in any kind of textiles or even in shoes or the sole of a shoe.

The above illustrations show only a small overview of the possible areas of application, wherein the above list of areas of application is to be regarded as exemplary and not exhaustive, since essentially any additional areas of application are conceivable for the planar heating element 300.

In addition, the planar heating element 300, wherein the electrical resistor element 270-3 comprises heating wires arranged in a garment, can very effectively use the planar contact terminal areas 270-1, 270-2 to electrically contact the heating wires 270-3 and to provide a solder connection for "soldering" a lead wire to the respective planar contact terminal area.

According to an embodiment, a method for producing a planar heating element 300 comprises the following steps: providing an electrical heating resistor element 270-3 on a surface area 262 of a device 260, and applying first and second planar, electrically conductive layer areas 270-1, 270-2 by means of a plasma coating or by means of plasma spraying on a surface area 262 of a device 260 with the electrical heating resistor element 270-3, wherein the electrical heating resistor element 270-3 is arranged between the first and second planar, electrically conductive layer areas 270-1, 270-2, wherein the first planar electrically conductive layer area 270-1 is arranged as a first contact terminal area at least in some areas on a first edge area 270-3A of the electrical resistor heating element 270-3 and is electrically connected and materially bonded to the same, wherein the second planar electrically conductive layer area 270-2 is applied as a second contact terminal area at least in areas to a second edge area 270-3B of the electrical heating resistor element 270-3 and is electrically connected and materially bonded to the same, and wherein the first and second planar, electrically conductive layer areas 270-1, 270-2 have a conductivity that is at least twice as high as that of the electrical heating resistor element 270-31.

The first planar, electrically conductive layer area 270-1 is thus at least in areas or completely superimposed or overlapping with the first edge area of the electrical heating resistor element 270-2 on the electrical heating resistor element 270-2 and is electrically connected and materially bonded to the same, wherein the second planar, electrically conductive layer area 270-2 is arranged as a second contact terminal area at least in areas or completely superimposed or overlapping with the second edge area of the electrical heating resistor element 270-3 on the electrical heating resistor element 270-3 and is electrically connected and materially bonded to the same.

Due to the extremely exact dosage of the needed powder quantity to the powder processing means, e.g. to a plasma coating arrangement or a plasma nozzle for plasma spraying, essentially any surface structures of a device can be coated extremely uniformly and exactly, wherein further the electrical properties of the applied layer structures can be adjusted and dimensioned very exactly. Thus, for example, planar contact areas can be applied in a plasma-induced manner on a surface area of a device, which can be electrically connected and materially bonded to the edge areas of an intermediate electrical (e.g. planar) heating resistor element. In addition, the applied layer structures can be materially bonded to the device to be coated or can be integrally formed.

By the feeding rate adjusted for the oscillating feeder, i.e. by the powder quantity applied to the surface area of the component and the resulting particle concentration, comprising, for example, a conductive material, the resistance coating or the layer resistance (reciprocal to the conductivity) of the respective planar, electrically conductive layer area can be formed, so that these layer areas can be configured as contact terminal areas for the electrical heating resistor element. In particular, the contact terminal areas are connected and bonded to the edge area of the electrical heating resistor element both electrically and materially, i.e. essentially inseparably, by the plasma-induced layer application method.

Further, according to a first embodiment, it is possible to use different powder materials or layer materials with different resulting layer resistances (also area resistances), both for the contact terminal areas and for the planar resistor structure, which is configured as an electrical heating resistor element between the contact terminal areas, during the application process.

Further, it is possible to use the same powder material or layer material both for the contact terminal areas and for the planar resistor structure, wherein for the contact terminal areas, by means of multiple coating or by means of several coating processes a "denser" or thicker coating layer can be produced, which has a considerably higher conductivity (area conductivity), e.g. at least by a factor of two, five or ten, compared to the planar resistor structure which acts as an electrical heating resistor element.

Further, it is also possible that the contact terminal areas are arranged as elongated areas or islands within the applied, planar resistor structure of the electrical heating resistor element, e.g. at edge areas of the same.

Due to the planar or relatively large contact terminal areas for the planar resistor structure configured as an electrical heating element, it is possible to couple a sufficiently high power over a large area into the planar resistor structure configured as an electrical heating resistor element to obtain sufficient heating due to the conversion of electrical energy into thermal energy (heat).

The electrically conductive layer areas acting as contact terminal areas can, for example, be formed on top of each other with the planar resistor structure acting as an electrical heating resistor element by means of a plasma coating process.

According to a first aspect, an apparatus 100 for feeding and dosing powder 112 can comprise: a powder storage container 110 for storing and providing powder 112, an oscillating feeder 120 with a feeding means 122 having an adjustable feeding rate for dispensing the powder 112 to a powder outlet 124 with the adjustable feeding rate, a conduit arrangement 130 for feeding the powder 112 dispensed by the oscillating feeder 120 in a feeding gas 115 as a powder-gas mixture 116 and for supplying the powder-gas mixture 116 to a powder processing means 200, wherein a decoupling means 132 is provided in the conduit arrangement 130 for extracting a defined proportion PM2 of the powder 112 from the powder-gas mixture 116, a powder quantity measuring arrangement 140 for detecting the decoupled powder quantity PM2 per unit time and for providing a powder quantity information signal S1, the extracted powder quantity PM2 per unit time having a predetermined ratio to the fed powder quantity PM1 of the oscillating feeder 120 within a tolerance range, and a control means 150 that is configured to adjust the adjustable feeding rate of the oscillating feeder 120 to a predetermined set value based on the powder quantity information signal S1 provided by the powder quantity measuring arrangement 140.

According to a second aspect with reference to the first aspect, the decoupling means 132 can be configured to extract a predetermined proportion PM2 of the powder quantity PM1 dispensed by the oscillating feeder 120 and transported in the conduit arrangement 130 in the powder-gas mixture 116.

According to a third aspect with reference to at least one of the first to second aspects, the decoupler 132 can be divided into different volume areas 132-1, . . . , 132-5 along the flow direction of the powder-gas mixture 116 to obtain a homogeneous distribution of the powder-gas mixture 116 in the decoupling means 132.

According to a fourth aspect with reference to the third aspect, the decoupling means 132 can comprise an inlet area 132-1, an expansion area 132-2, a homogenization area 132-3, a decoupling area 132-4 and an output area 132-5 in the flow direction of the powder-gas mixture 116.

According to a fifth aspect with reference to at least one of the first to fourth aspects, the powder quantity measuring arrangement 140 can comprise a load cell to detect the weight of the decoupled powder quantity PM2 per unit time.

According to a sixth aspect with reference to at least one of the first to fifth aspect, the powder quantity measuring arrangement 140 can be configured to optically detect the number and/or size of the extracted powder particles.

According to a seventh aspect with reference to at least one of the first to sixth aspects, the control means 150 can be configured to determine the current feeding rate of the oscillating feeder 120 based on the powder quantity information signal S1 and, in the event of a deviation of the current feeding rate of the oscillating feeder 120 from the predetermined set value or a target feeding rate, to control the oscillating feeder 120 to adjust the feeding rate to the set value or the target feeding rate.

According to an eighth aspect with reference to the seventh aspect, the control means 150 can be configured to continuously adjust the current feeding rate of the oscillating feeder 120 to the target feeding rate.

According to a ninth aspect with reference to at least one of the first to eighth aspects, the feeding means 122 of the oscillating feeder for feeding the powder 112 can be excited to an oscillating movement perpendicular and parallel to the feeding direction, and the oscillating feeder 120 can be configured to perform an oscillating movement of the feeding means 122 with an oscillation frequency of 1 to 1000 Hertz or of 50 to 300 Hertz at an oscillation width or amplitude in a range of 1 μm to 1000 μm or of 5 μm to 200 μm.

According to a tenth aspect with reference to at least one of the first to ninth aspects, the oscillating feeder 120 can be configured as piezoelectrically or magnetically driven feeding means 122.

According to an eleventh aspect with reference to at least one of the seventh to tenth aspects, the control means 150 can be configured to adjust the oscillating movement of the feeding means 122 of the oscillating feeder 120 based on the powder quantity information signal S1 to obtain the target feeding rate.

According to a twelfth aspect with reference to at least one of the first to eleventh aspects, the powder storage container 110 can comprise outlet means 114 for providing the powder 112 to the feeding means 122, the apparatus further comprising: distance adjusting means for adjusting a distance between an outlet end 114-A of the outlet means 114 and a feeding surface area 122-A of the feeding means 122 for adjusting a pre-dosage of the powder quantity PM0 provided by the powder storage container 110 to the feeding means 122 of the oscillating feeder 120.

According to a thirteenth aspect with reference to at least one of the first to twelfth aspects, the apparatus 100 can also comprise: a powder switch arrangement 160 in the flow direction of the powder-gas mixture 116 downstream of the decoupling means 132 in the conduit arrangement 130, wherein the powder switch arrangement 162 is configured to determine the powder quantity PM3 present in the conduit arrangement 130 downstream of the decoupling means 132 during an operating break $OUT_{200}$ of the powder processing means 200 and to provide a further powder quantity information signal S3 of the powder quantity PM3 for evaluation to the control means 150.

According to a fourteenth aspect with reference to the thirteenth aspect, the control means 150 can also be configured to determine the proportion PM2 of the powder 112 extracted by the decoupling means 132 in the conduit arrangement 130 from the powder-gas mixture 116 based on the further powder quantity information signal S3 provided by the powder switch arrangement 160.

According to a fifteenth aspect with reference to at least one of the first to fourteenth aspects, the powder processing means 200 can be configured as plasma spraying means or plasma nozzle.

According to a sixteenth aspect, an apparatus 101 for producing a layer structure 270 on a surface area 262 of a device 260 can comprise: an apparatus 100 for feeding and dosing powder 112 according to one of the preceding aspects, for providing powder particles 112 to a plasma spraying arrangement 200; and a plasma spraying arrangement 200 comprising a plasma source 208 for introducing plasma 210 into a process area 206 to activate the provided powder particles 112 in the process area 206 with the plasma 210, and application means 212 for applying the activated powder particles 112 to the surface area 262 of the device 260 to obtain the layer structure 270 on the surface area 262 of the device 260.

According to a seventeenth aspect, a method for producing a layer structure 270 on a surface area 262 of a device 260 can comprise the following steps: providing powder particles in a process area of a plasma spraying means with the apparatus 100 for feeding and dosing powder 112 according to any one of aspects 1 to 15, activating the provided powder particles 112 in a process area 206 of a plasma spraying arrangement 200 with the plasma 210 of a plasma source 208, and applying the activated powder particles 112 to the surface area 262 of the device 260 to obtain the layer structure 270 on the surface area 262 of the device 260.

According to an eighteenth aspect, a planar heating element 300 can comprise: an electrical heating resistor element 270-3, and a first and a second planar, electrically conductive layer area 270-1, 270-2, wherein the electrical heating resistor element 270-3 is arranged between the first and the second planar, electrically conductive layer areas 270-1, 270-2, wherein the first planar, electrically conductive layer area 270-1 is arranged as a first contact terminal area at least in areas on a first edge area 270-3A of the electrical resistor heating element 270-3 and is electrically connected and materially bonded connected to the same, wherein the second planar, electrically conductive layer area 270-2 is arranged as a second contact terminal area at least in areas on a second edge area 270-3B of the electrical heating resistor element 270-3 and is electrically connected and materially bonded to the same, and wherein the first and second planar, electrically conductive layer areas 270-1, 270-2 have a conductivity that is at least twice as high as that of the electrical heating resistor element 270-3.

According to a nineteenth aspect with reference to the eighteenth aspect, the first and second planar, electrically conductive coating areas 270-1, 270-2 can be applied plasma coating or by plasma spraying to a surface area 262 of a device 260 with the electrical heating resistor element 270-3.

According to a twentieth aspect with reference to at least one of the eighteenth to nineteenth aspects, the electrical heating resistor element 270-3 can be configured as a planar resistor structure applied by plasma spraying.

According to a twenty-first aspect with reference to the twentieth aspect, the first and second contact terminal areas 270-1, 270-3 and the planar, electrically conductive layer area 270-3 can be formed integrally with the surface area 262 of the device 260.

According to a twenty-second aspect with reference to at least one of the twentieth to twenty-first aspects, the planar resistor structure 270-3 can be configured to convert electrical energy into thermal energy as the electrical heating element when electrically energized.

According to a twenty-third aspect with reference to at least one of the eighteenth to twenty-second aspects, the first and second planar contact terminal areas 270-1, 270-2 can be formed as a solderable metal layer.

According to a twenty-fourth aspect with reference to at least one of the eighteenth to twenty-third aspects, the planar heating element 300 can be tile-shaped and can be electrically connected in series or in parallel to a plurality of adjacent, additional planar heating elements 300.

According to a twenty-fifth aspect with reference to at least one of the eighteenth to twenty-fourth aspects, the planar heating element may be polygonal or rectangular, wherein the first and second planar contact terminal areas 270-1, 270-2 can be configured on opposite edge areas 270-3A, 270-3B of the electrical heating resistor element 270-3.

According to a twenty-sixth aspect with reference to at least one of the eighteenth to twenty-fifth aspects, perforations or vias 272 passing through the device can be provided in the surface area 262 of the planar device 260.

According to a twenty-seventh aspect with reference to the twenty-sixth aspect, the perforations can be provided in the surface area 262 of the planar device 260 to provide air flow through the perforations of the planar device 260 and to heat the air flow through the planar device 260 when the electrical heating resistor element 270-3 is energized.

According to a twenty-eighth aspect with reference to at least one of the eighteenth to twenty-seventh aspects, the planar, electrically conductive layer area of the electrical heating resistor element 270-3 can have a uniform area resistance to provide a uniform heating effect on the surface area 262 of the planar device 260.

According to a twenty-ninth aspect with reference to at least one of the eighteenth to twenty-seventh aspects, the planar, electrically conductive layer area 270-3 of the electrical heating resistor element 270-3 can have a predetermined distribution of area resistance on the surface area 262 of the planar device 260 to obtain a heating effect of the planar heating element on the surface area 262 of the device 260 which differs in areas when the electrical heating resistor element 270-3 is energized.

According to a thirtieth aspect with reference to at least one of the eighteenth to twenty-ninth aspects, the planar heating element can be configured as a surface area of an interior panel of a motor vehicle.

According to a thirty-first aspect with reference to at least one of the eighteenth to twenty-ninth aspects, the planar heating element can be configured as a surface area of a garment.

According to a thirty-second aspect with reference to at least one of the eighteenth to nineteenth aspect, the electrical resistor element 270-3 can be configured as a heating wire.

According to a thirty-third aspect, a method for producing a planar heating element 300 can comprise the following steps: providing an electrical heating resistor element 270-3 on a surface area 262 of a device 260 and applying first and second planar, electrically conductive layer areas 270-1, 270-2 on a surface area 262 of a device 260 with the electrical heating resistor element 270-3 by means of a plasma coating or by means of plasma spraying, wherein the electrical heating resistor element 270-3 is arranged between the first and second planar, electrically conductive layer areas 270-1, 270-2, wherein the first planar electrically conductive layer area 270-1 is arranged as a first contact terminal area at least in areas on a first edge area 270-3A of the electrical resistor heating element 270-3 and is electrically connected and materially bonded to the same, wherein the second planar electrically conductive layer area 270-1 is arranged as a second contact terminal area at least in areas on a second edge area 270-3A of the electrical resistor heating element 270-3, electrically conductive layer area 270-2 is arranged as a second contact terminal area at least in some areas on a second edge area 270-3B of the electrical heating resistor element 270-3 and is electrically connected and materially bonded to the same, and wherein the first and second planar, electrically conductive layer areas 270-1, 270-2 have a conductivity that is at least twice as high as that of the electrical heating resistor element 270-3.

According to a thirty-fourth aspect with reference to the thirty-third aspect, the method can further comprise the following step: applying the electrical heating resistor element 270-3 as a planar resistor structure on the surface area 262 of the device 260 by plasma spraying.

Although some aspects of the present disclosure have been described as features related to an apparatus, it is obvious that such a description can also be considered as a description of corresponding method features. Although some aspects have been described as features related to a method, it is obvious that such a description can also be considered as a description of corresponding features of an apparatus or the functionality of an apparatus.

In the above detailed description, in some cases different features were grouped together in examples to rationalize the disclosure. This type of disclosure should not be interpreted as the intention that the claimed examples comprise more features than are explicitly stated in each claim. Rather, as the following claims will state, the subject matter may have less than all the features of a single disclosed example. Consequently, the following claims are hereby included in the detailed description, wherein each claim may stand as a separate example. While each claim may stand as a separate and distinct example, it should be noted that although dependent claims in the claims relate to a specific combination with one or more other claims, other examples also include a combination of dependent claims with the subject matter of each other dependent claim or a combination of each feature with other dependent or independent claims. Such combinations are included unless it is stated that a specific combination is not intended. It is further intended that a combination of features of a claim with any other independent claim is also included, even if that claim is not directly dependent on the independent claim.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Apparatus for feeding and dosing powder, comprising:

a powder storage container for storing and providing powder, an oscillating feeder comprising a feeding unit with an adjustable feeding rate for dispensing the powder to a powder outlet with the adjustable feeding rate, a conduit arrangement for feeding the powder dispensed by the oscillating feeder in a feeding gas as a powder-gas mixture and for supplying the powder-gas mixture to a powder processor, wherein a decoupler is provided in the conduit arrangement for extracting a defined proportion of the powder from the powder-gas mixture, a powder quantity measuring arrangement for detecting a decoupled powder quantity per unit time and for providing a powder quantity information signal, wherein the decoupled powder quantity per unit time comprises a predetermined ratio to a feed powder quantity of the oscillating feeder within a tolerance range, and a controller configured to adjust the adjustable feeding rate of the oscillating feeder to a predetermined set value based on the powder quantity information signal provided by the powder quantity measuring arrangement.

2. Apparatus according to claim 1, wherein the decoupler is configured to extract a predetermined proportion of the powder quantity dispensed by the oscillating feeder and transported in the conduit arrangement in the powder-gas mixture.

3. Apparatus according to claim 1, wherein the decoupler is divided into different volume areas along the flow direction of the powder-gas mixture to acquire a homogeneous distribution of the powder-gas mixture in the decoupler.

4. Apparatus according to claim 3, wherein the decoupler comprises an inlet area, an expansion area, a homogenization area, a decoupling area and an output area in the flow direction of the powder-gas mixture.

5. Apparatus according to claim 1, wherein the powder quantity measuring arrangement comprises a load cell for detecting a weight of the decoupled powder quantity per unit time.

6. Apparatus according to claim 1, wherein the powder quantity measuring arrangement is configured to optically detect a number and/or size of the decoupled powder particles.

7. Apparatus according to claim 1, wherein the controller is configured to determine a current feeding rate of the oscillating feeder based on the powder quantity information signal and, in the event of a deviation of the current feeding rate of the oscillating feeder from a predetermined set value or a target feeding rate, to control the oscillating feeder to adjust the feeding rate to the set value or the target feeding rate.

8. Apparatus according to claim 7, wherein the controller is configured to continuously adjust the current feeding rate of the oscillating feeder to the target feeding rate.

9. Apparatus according to claim 1, wherein the feeding unit of the oscillating feeder is excited to an oscillating movement perpendicular and parallel to a feeding direction to feed the powder, and wherein the oscillating feeder is configured to perform an oscillating movement of the feeding unit with an oscillation frequency of 1 to 1000 Hertz or of 50 to 300 Hertz at an oscillation width or amplitude in a range of 1 μm to 1000 μm or of 5 μm to 200 μm.

10. Apparatus according to claim 1, wherein the oscillating feeder is configured as piezoelectrically or magnetically driven feeding unit.

11. Apparatus according to claim 7, wherein the controller is configured to adjust the oscillating movement of the feeding unit of the oscillating feeder based on the powder quantity information signal to acquire the target feeding rate.

12. Apparatus according to claim 1, wherein the powder storage container comprises an outlet for providing the powder to the feeding unit, further comprising:

a distance adjuster for adjusting a distance between an outlet end of the outlet and a feeding surface area of the feeding unit for adjusting a pre-dosage of the powder quantity provided by the powder storage container to the feeding unit of the oscillating feeder.

13. Apparatus according to claim 1, further comprising:

a powder switch arrangement in a flow direction of the powder-gas mixture downstream of the decoupler in the conduit arrangement, wherein the powder switch arrangement is configured to determine a powder quantity present in the conduit arrangement downstream of the decoupler during an operating break of the powder processor and to provide a further powder quantity information signal of the powder quantity for evaluation to the controller.

14. Apparatus according to claim 13, wherein the controller is further configured to determine a proportion of the powder extracted by the decoupler in the conduit arrangement from the powder-gas mixture based on the further powder quantity information signal provided by the powder switch arrangement.

15. Apparatus according to claim 1, wherein the powder processor is configured as a plasma sprayer or plasma nozzle.

16. Apparatus for producing a layer structure on a surface area of a device, comprising:

an apparatus for feeding and dosing powder according to claim 1, for providing powder particles to a plasma spraying arrangement; and a plasma spraying arrangement comprising a plasma source for introducing plasma into a process area to activate the provided powder particles in the process area with the plasma, and an application unit for applying the activated powder particles to the surface area of the device to acquire the layer structure on the surface area of the device.

17. Method for producing a layer structure on a surface area of a device, comprising:

providing powder particles in a process area of a plasma sprayer with the apparatus for feeding and dosing powder according to claim 1, activating the provided powder particles in a process area of a plasma spraying arrangement with the plasma of a plasma source, and applying the activated powder particles to the surface area of the device to acquire the layer structure on the surface area of the device.

* * * * *